Feb. 26, 1957 D. G. CUMMINGS ET AL 2,783,389

MARKING INSPECTION DEVICE

Filed May 31, 1950 10 Sheets-Sheet 1

DONALD G. CUMMINGS
BERT VAN WEELDEN
OLIVER R. WOODS
Inventors

By Robert E. ...
Attorney

MARKING INSPECTION DEVICE

Filed May 31, 1950 10 Sheets-Sheet 2

DONALD G. CUMMINGS
BERT VAN WEELDEN
OLIVER R. WOODS
Inventors

By

Attorney

Feb. 26, 1957

D. G. CUMMINGS ET AL 2,783,389

MARKING INSPECTION DEVICE

Filed May 31, 1950

10 Sheets-Sheet 3

DONALD G. CUMMINGS
BERT VAN WEELDEN
OLIVER R. WOODS
Inventors

By

[signature]

Attorney

DONALD G. CUMMINGS
BERT VAN WEELDEN
OLIVER R. WOODS
Inventors

By [signature]
Attorney

Feb. 26, 1957 D. G. CUMMINGS ET AL 2,783,389

MARKING INSPECTION DEVICE

Filed May 31, 1950 10 Sheets-Sheet 5

DONALD G. CUMMINGS
BERT VAN WEELDEN
OLIVER R. WOODS
Inventors

By
Attorney

Feb. 26, 1957 D. G. CUMMINGS ET AL 2,783,389

MARKING INSPECTION DEVICE

Filed May 31, 1950 10 Sheets-Sheet 6

DONALD G. CUMMINGS
BERT VAN WEELDEN
OLIVER R. WOODS

Inventors

By Robert E. [signature]

Attorney

DONALD G. CUMMINGS
BERT VAN WEELDEN
OLIVER R. WOODS
Inventors

By
Attorney

MARKING INSPECTION DEVICE

Filed May 31, 1950 10 Sheets-Sheet 8

DONALD G. CUMMINGS
BERT VAN WEELDEN
OLIVER R. WOODS
Inventors

By [signature]
Attorney

MARKING INSPECTION DEVICE

Filed May 31, 1950 10 Sheets-Sheet 9

DONALD G. CUMMINGS
BERT VAN WEELDEN
OLIVER R. WOODS
Inventors

By [signature]
Attorney

MARKING INSPECTION DEVICE

DONALD G. CUMMINGS
BERT VAN WEELDEN
OLIVER R. WOODS
Inventors

By [signature]
Attorney

United States Patent Office 2,783,389

Patented Feb. 26, 1957

2,783,389

MARKING INSPECTION DEVICE

Donald G. Cummings, Kalamazoo Township, Kalamazoo County, Oliver R. Woods, Scotts, and Bert Van Weelden, Kalamazoo, Mich., assignors to The Upjohn Company, Kalamazoo, Mich., a corporation of Michigan Application May 31, 1950, Serial No. 165,294

52 Claims. (Cl. 250—214)

This invention relates in general to a device for inspecting surface markings or characteristics and particularly to a type thereof which automatically inspects a plurality of successively prescribed articles and selects therefrom those articles failing to have certain predetermined surface markings thereon or characteristics. More particularly, the device selects and rejects from a plurality of similarly labeled containers those containers having defective, erroneous or misplaced labels.

Persons familiar with the sale or use of merchandise in containers, such as bottled pharmaceuticals, have long appreciated the necessity of having the correct label properly positioned upon the outside of each container. An incorrect label upon a container might easily result in the improper use of the contents of the container, whereas improper positioning of a label upon a container will detract from its appearance and thereby adversely affect the salability of the merchandise contained therein.

According to present methods, containers, hereinafter illustratively referred to as bottles, having labels are visually inspected. The accuracy of this method, which is dependent upon the individual inspector, always involves the risk of human error, and, therefore, it is not entirely satisfactory. Furthermore, where large numbers of bottles are being filled, such as in a pharmaceutical establishment, many persons are required for the sole purpose of visually inspecting labels, and such visual inspection of the labeled bottles thus contributes substantially to the cost of the finished product.

Accordingly, a primary object of this invention is to provide a fully automatic inspection machine which will detect and reject containers, such as bottles, having either incorrect or improperly positioned labels.

A further object of this invention is to provide a label inspection machine as aforesaid which will eliminate the need for visual inspection of labels on containers and which will be more consistent and accurate than human inspectors in its detection and rejection of containers having either incorrect or improperly positioned labels.

A further object of this invention is to provide a label inspection machine as aforesaid having a removable scanning disk for each type of label to be inspected, which disks may be easily and quickly interchanged.

A further object of this invention is to provide a label inspection machine as aforesaid by means of which the scanning disks can be made for use therewith.

A further object of this invention is to provide a label inspection machine as aforesaid which can be used to inspect a plurality of continuously moving labeled bottles being carried upon a conventional conveyor system, particularly as said bottles leave the labeling machine.

A further object of this invention is to provide a label inspection machine as aforesaid which is small, portable and easily adjustable to various types of label positions.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, we have provided an automatic label inspection machine having an inspection head, a pass mechanism and an electronic device which, when appropriately stimulated by the inspection head, actuates the pass mechanism. The inspection head is comprised of a frame, including in one preferred embodiment a scanning disk housing having an opening therethrough, a focusable optical system adjustably mounted upon said frame and aligned with said opening in said scanning disk housing, and a scanning disk rotatably and removably supported within said scanning disk housing so that a selected portion of said disk intercepts light passing through said optical system and said opening. A photocell unit is positioned to receive such light passing through the optical system and the said opening as is not intercepted by the scanning disk.

The electrical system is comprised, in this embodiment of the invention, of a photoelectric unit which is mounted upon the inspection head frame and a power unit and control unit which units are preferably mounted upon independent chassis. The pass mechanism is comprised of a solenoid actuated reject arm which normally extends across a conveyor to intercept and remove containers therefrom. As the inspection head detects a correct label properly positioned, by appropriate transmission of energy through the electrical system, the reject arm is caused to withdraw out of its normal blocking position across said conveyor and permit the bottle to pass. Whenever a bottle bearing an incorrect label, or correct label incorrectly positioned, appears, the reject arm is not actuated and the bottle is thereby removed from the conveyor. By this arrangement it will be noted that should the device fail to function correctly, it will commence immediately to reject all bottles and thus both draw an operator's attention at once and also assure that no improperly labeled bottles will pass the inspection station.

More specifically, in the preferred form of the invention, a plurality of photographic facsimiles of the label, or other marking which may be on the bottles, are placed equidistant from each other around the periphery of a scanning disk to intercept the light passing through the optical system and the opening toward the photocell. The optical system is focused on the labels being inspected as they pass said inspection head to direct a real image thereof onto the scanning disk. With the disk spinning rapidly, a very large number of the facsimiles thereon will be interposed in the line of light passing from the optical system to the photocell, and as a given bottle moves past the inspection head one of such facsimiles, if said label is correct, will coincide with the image reflected from the label on said bottle. Until such instant of this coincidence, the passage of the several facsimiles through the light beam will cause the beam of light falling on the photocell to merely rapidly and regularly fluctuate in intensity. At the instant of coincidence, however, if the disk facsimile is, as it may be, a negative image, the light beam is not only substantially totally blocked from the photocell, but the change in illumination intensity thereon is much faster per unit of time than are the cyclic changes, or normal pulsations, brought about by the passage of non-coinciding facsimiles. Thus, in the preferred form of the invention, the maximum change in magnitude, as well as the maximum rate of change, both occur at the instant of coincidence. The rapid change in electrical output of the photocell or a phototube, resulting from this rapid change in light intensity at the instant of coincidence, hereinafter sometimes termed "signal pulsation," passes a suitable filter which blocks the said normal pulsations and then, if they are of the magnitude resulting from substantially complete coincidence, they are effective to trigger a time controlled unit which energizes the solenoid for a period of time long enough to retract the reject arm and permit the bottle to pass.

If the label on a given bottle is incorrect, or improperly positioned, there will be no such coincidence with any facsimile and consequently no such energizing of the solenoid. If it is desired to permit some tilting of the labels on the bottles, part of the facsimiles may be tilted slightly with respect to the disk radii.

Although the reject arm may be retracted either by a change in the intensity of light falling upon the phototube or by a change therein being effected at a rate not less than a predetermined minimum, in the preferred embodiment the actuation of the reject arm is based upon both magnitude of change, as such, as well as upon the rate of change in the intensity of light falling upon the phototube. This follows because one facet of this invention comprises recognition that both the maximum change in intensity and the maximum rate of change in intensity will occur at complete coincidence.

Incidentally, since both critical characteristics occur at the same moment, this combined effect in the preferred embodiment is secured with a minimum of additional electrical equipment over what would be required for response to either characteristic alone.

It will also be recognized that although the principle of my invention is herein illustrated in terms of negative facsimiles, such principle will also work with positive facsimiles being used on the disk, or being otherwise interposed into the beam of light reflected from the label. Coincidence between the reflected image of a marking facsimile permits a sudden increase in the amount of light falling on the photocell. In this case the electronic circuitry will be constructed to be responsive to and actuated by surges, rather than drops, in the photocell output and at a predetermined rate of change and of predetermined magnitude.

For illustration of one preferred embodiment of the invention, attention is directed to the accompanying drawings in which.

Figures 11, 12, 13, 14:
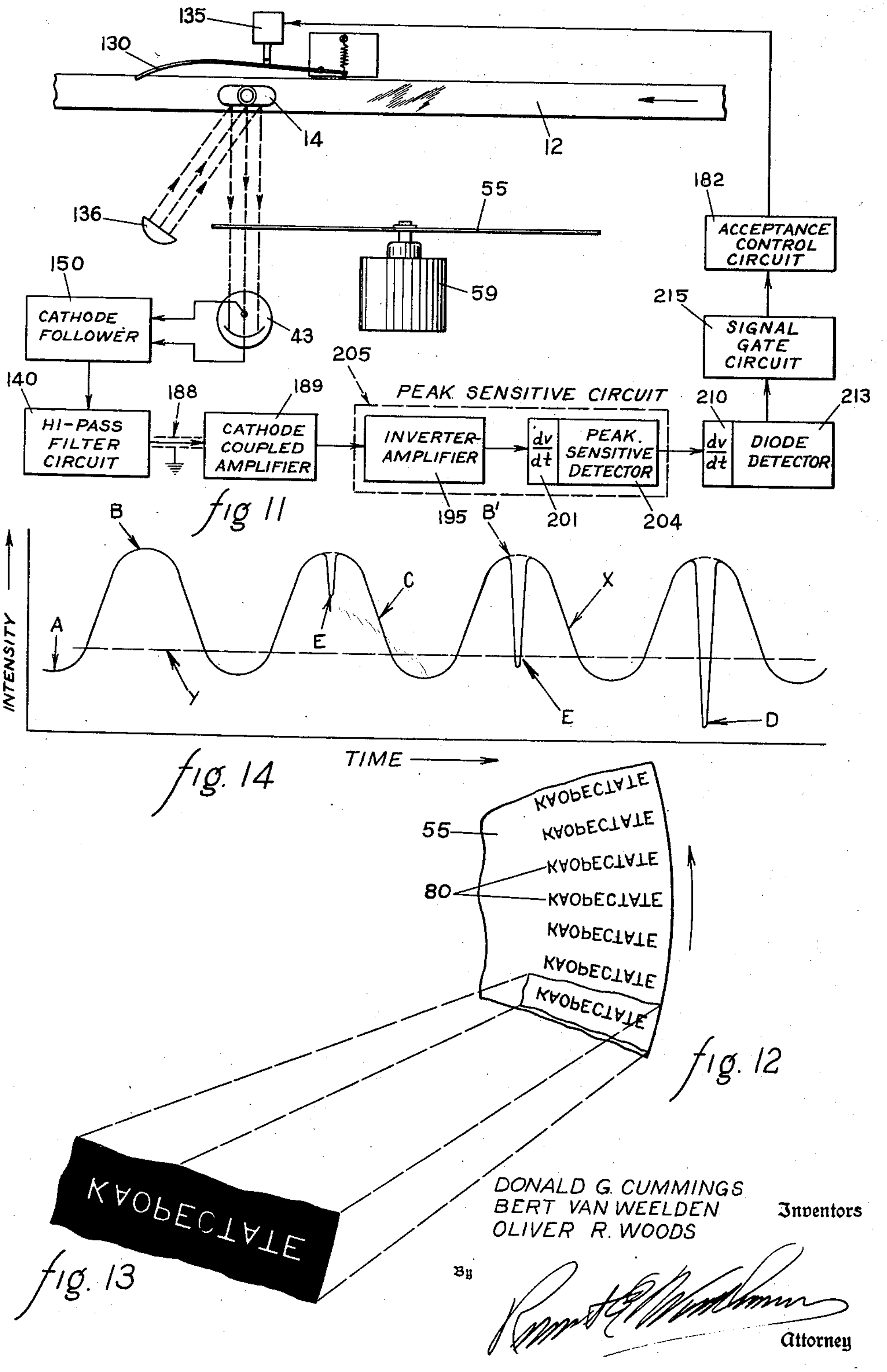
Figure 11 is a diagrammatic, functional view of the marking inspection device.
Figure 12 is a fragmentary front view of the scanning disk showing schematically a plurality of facsimiles thereon.
Figure 13 is a fragmentary view of said scanning disk showing a single fascimile as projected from Figure 12.
Figure 14 shows in general the sinusoidal wave created by the fluctuation in light intensity upon the photoelectric cell and including a coincidence point thereon.

Figures 18 through 26, inclusive, illustrate block diagrams of alternate circuits insertable into the circuit shown in Figure 11, between the photocell and the acceptance control circuit.

Figure 27:
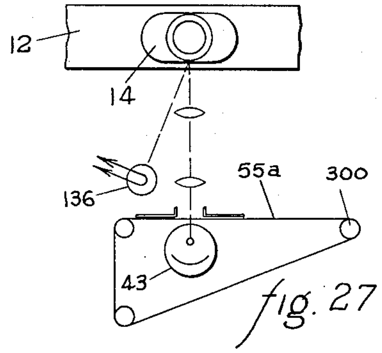
Figure 28:
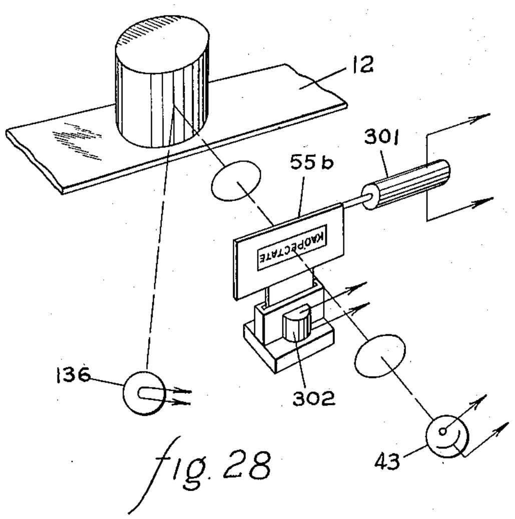
Figure 29:
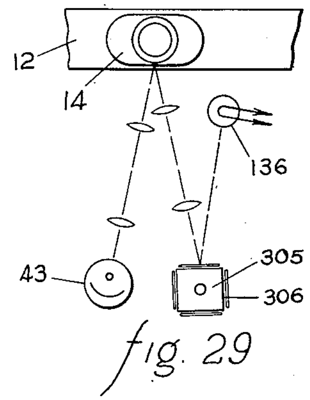

Figures 27, 28 and 29 show diagrammatically certain alternate structures for effective interception of the light beam with a facsimile of the marking on an article.

*In general*

In general, the marking inspection device (Figure 1), to which this invention relates, is comprised of an inspection head 10 which may be placed upon or adjacent to a conventional conveyor table 11 which supports a conventional conveyor belt 12. A pass mechanism 13 is supported upon said table adjacent to said conveyor belt and may be, but is not necessarily, placed on the opposite side thereof from the inspection head 10 and substantially aligned therewith. A plurality of labeled bottles 14, which are carried upon the conveyor belt 12, are moved thereby adjacent to the pass mechanism 13 and in front of the inspection head 10. The electrical system is comprised of the photoelectric unit 15, mounted upon the inspection head frame 16, the power and control unit 17 and the regulated power supply unit 19, which units may all be mounted upon the table 11 adjacent to the inspection head 10. These units actuate the pass mechanism as above indicated.

In order to facilitate the disclosure of the invention, the construction and operation of the mechanical aspects of a preferred embodiment of the inspection device mill be disclosed first, and then followed by the construction and operation of the electrical parts of said device.

*Mechanical construction*

The inspection head (Figures 1, 2, 3, 4 and 7) has a frame 16 which is preferably comprised of a base plate 18, a front plate 21, a back plate 22, an end plate 23 and a top plate 24, which plates are preferably, but not necessarily, fabricated from a suitable metal plate, such as aluminum.

Figures 2, 3:
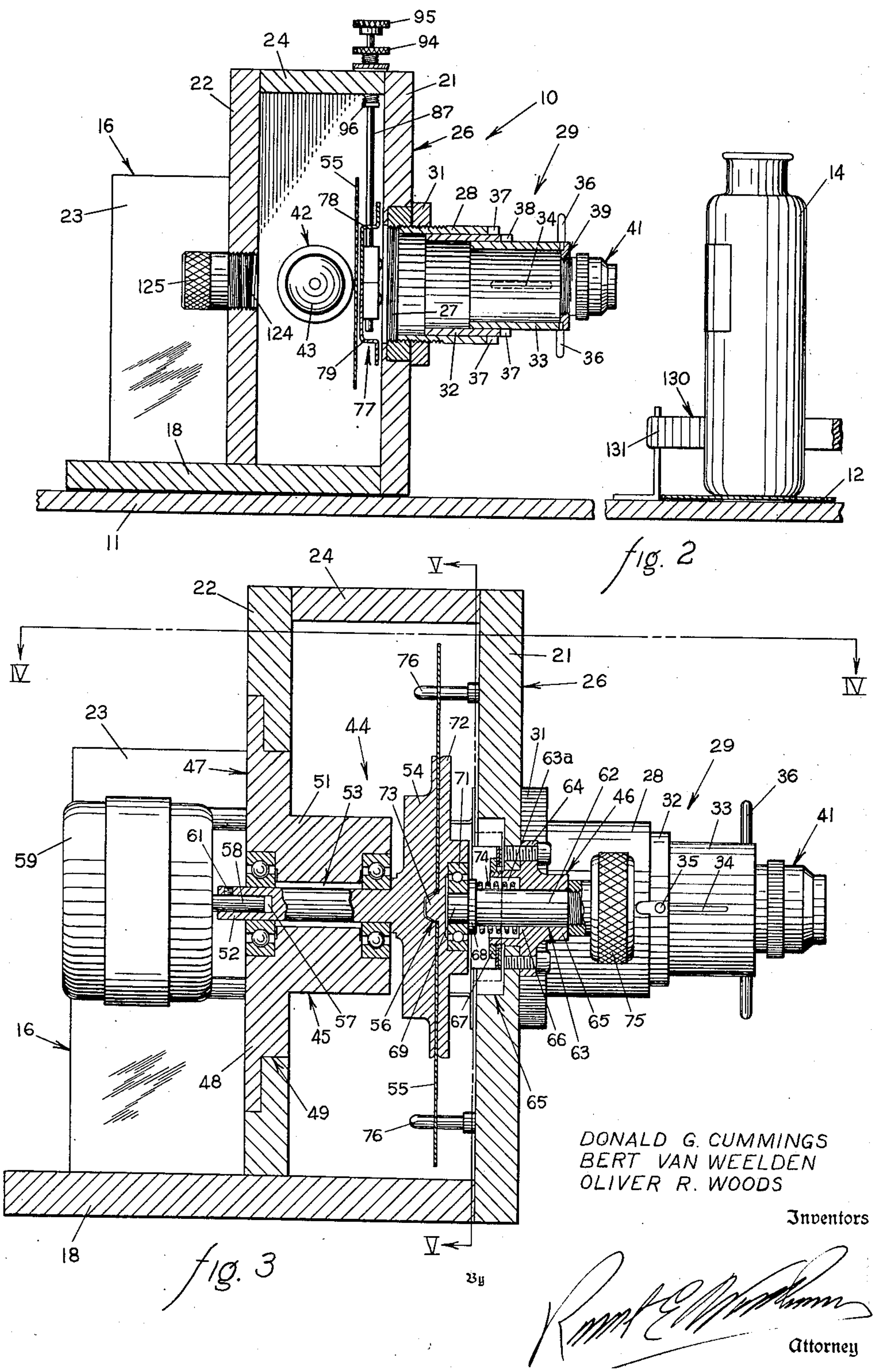
Figure 2 is a broken, sectional view taken along the line II—II of Figure 1.
Figure 3 is a sectional view taken along the line III—III of Figure 1.
Figure 4:
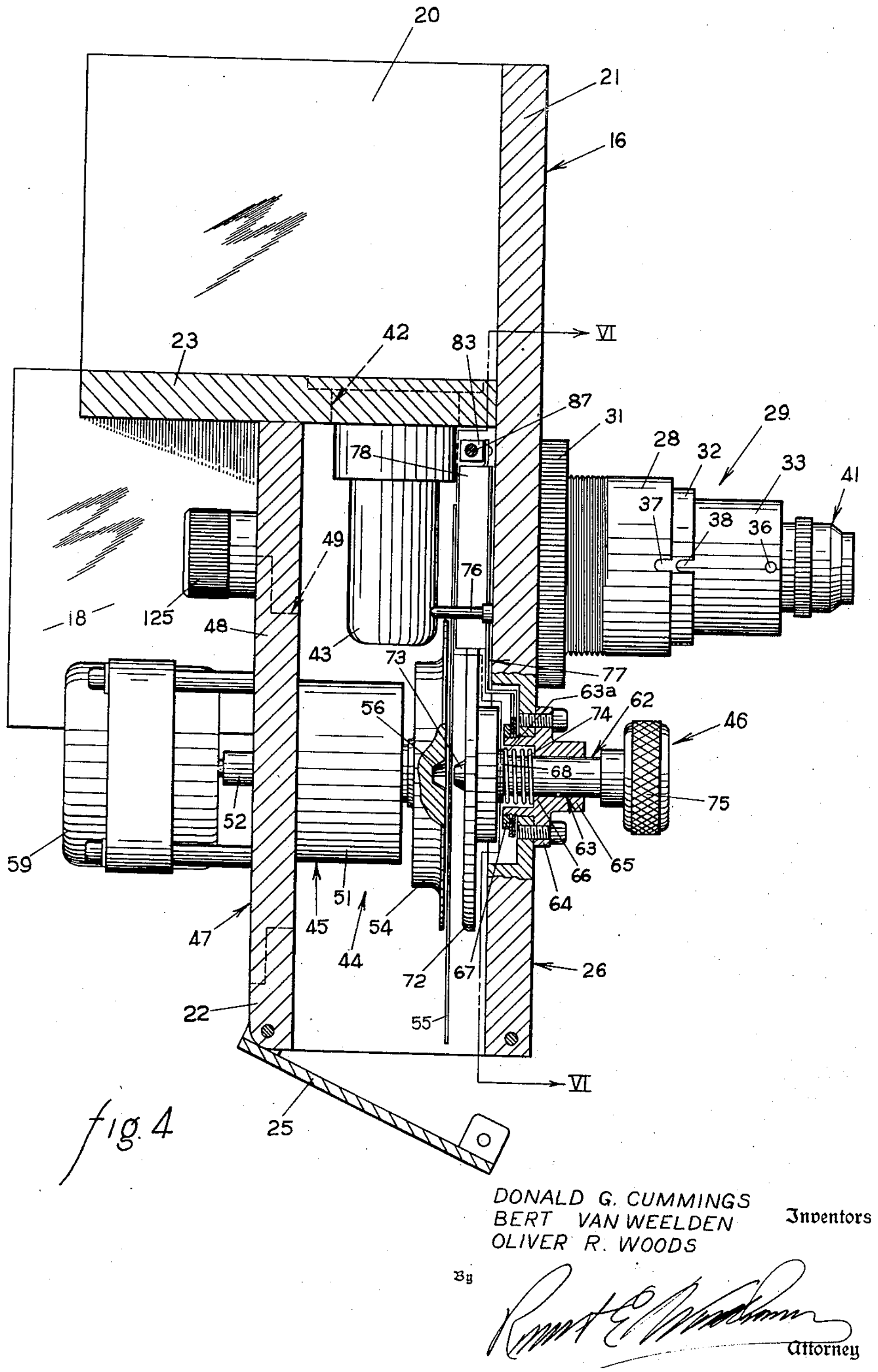
Figure 4 is a sectional view taken along the line IV—IV of Figure 3.

For the purpose of convenience in description the terms "front" and "back" or "forwardly" and "rearwardly" will refer to the rightward and leftward sides, respectively, of the inspection head 10 as said head appears in Figures 2, 3 and 4. The term "light" or "light beam" will normally refer to visible light but may be understood broadly as referring to any form of electromagnetic radiation, such as ultra-violet or infra-red, which is reflectable from the markings being inspected, controllable by lenses and capable of exciting electro-responsive apparatus.

The front plate 21, which is preferably perpendicular to the base plate 18, extends the full length of said base plate and may be secured to the front edge thereof by any convenient means, such as bolts. The back plate 22, which is spaced from, and preferably parallel with, the front plate 21, is secured to and supported upon the base plate 18 intermediate its extreme front and back edges.

The end plate 23 (Figure 4), which is preferably perpendicular to both the base plate 18 and the front plate 21, is secured to both said plates intermediate their extremities by any suitable means, such as bolts. The back plate 22 extends from one end of the base plate 18 to the end plate 23. Said back plate is supported upon said base plate and secured to both said base and end plates in any convenient manner. The end plate 23 and those portions of the base plate 18 and front plate 21 which extend beyond said end plate 23 on the opposite side thereof from the back plate 22 provide an appropriate space 20 for supporting the photoelectric unit 15 upon the inspection frame head 16.

Figure 5:
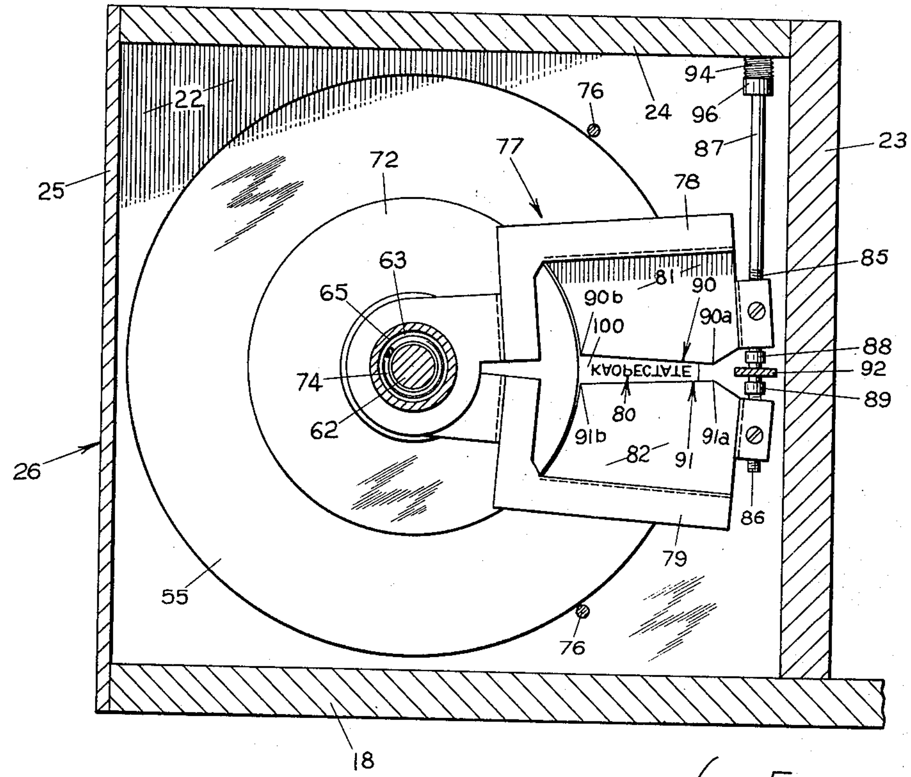
Figure 5 is a sectional view taken along the line V—V of Figure 3.

The top plate 24 (Figures 3 and 5), which preferably extends between the upper ends of the front, back and end plates 21, 22 and 23, respectively, is secured thereto by any suitable means, such as bolts. A hinged door 25 (Figure 4) completes the enclosure of the scanning disk housing 26.

A circular, threaded opening 27 (Figure 2), is provided through the front plate 21, preferably intermediate the upper and lower edges thereof, into the scanning disk housing 26 adjacent to the end plate 23. The large tube 28 (Figures 2 and 4) of a telescopic focusing device 29 externally threaded at one end thereof for reception into the threaded opening 27. A locking collar 31, which also threadedly engages the threaded end of said large tube 28, is provided to fix the position of the large tube 28 with respect to the front plate 21.

The telescopic focusing device 29, which may be of any convenient, conventional type, is in this embodiment of the invention comprised of said large tube 28, a medium tube 32, which is slidably held within the large tube 28, and a small tube 33 slidably held within the medium tube 32, Appropriate means, such as the slot 34 (Figure 3) in the small tube 33 and the pin 35 in the medium tube 32, may be provided for the purpose of aligning one tube with respect to another. A pair of diametrically opposed, leverage posts 36 may be secured to the cylindrical side walls of the small tube 33 near the front edge thereof (Figures 2 and 4) for rotational adjustment of the focusing device 29. Appropriate slots 37 and 38 are provided in the front edges of the medium and large tubes 32 and 28, respectively, for reception of said posts 36 when the telescopic focusing device 29 is fully retracted. Thus, when the posts 36 are engaging the slots 37 and 38, the said large, medium and small tubes may be rotated simultaneously. That end of the small tube 33 remote from the front plate 21 is provided with a threaded opening 39 into which a convenient, conventional optical device 41 may be threadedly received, said optical device being comprised of any suitable combination of lenses for projecting an inverted, real, image of a selected portion of the bottles 14 onto the hereinafter described scanning disk.

Figure 1:
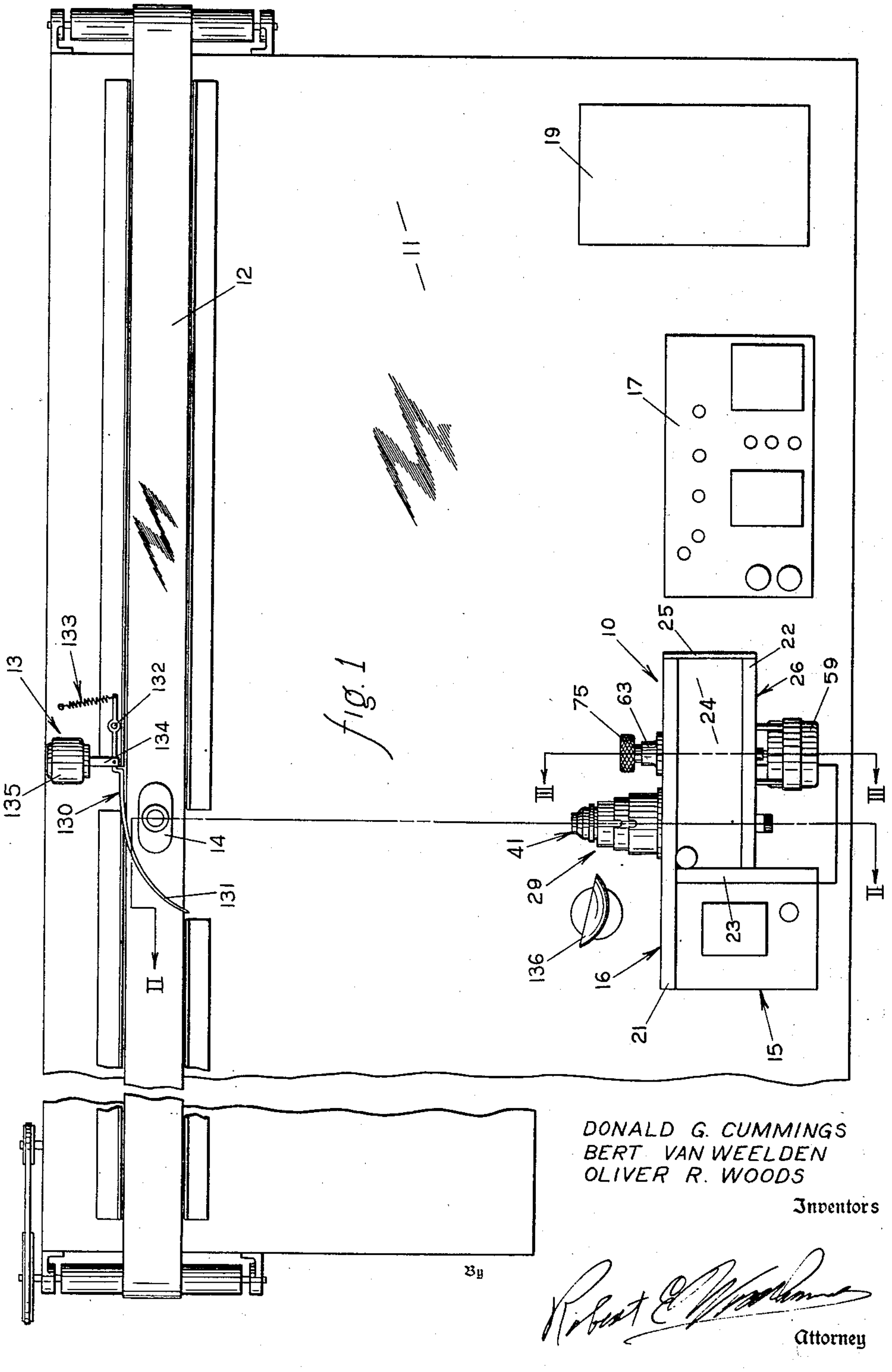
Figure 1 is a top plan view of a label inspection machine mounted adjacent to and in conjunction with a conveyor carrying a plurality of bottles.

An appropriate circular opening 42 (Figures 2 and 4) is provided through the end plate 23 into the scanning disk housing 26 for horizontal slidable reception of a photoelectric tube 43, which tube is preferably mounted on the chassis of the photoelectric unit 15 (Figure 1). The photoelectric tube 43 is preferably positioned within the scanning disk housing so that its lengthwise axis intersects the axis of the telescopic focusing device 29, and further so that said tube is squarely in front of and spaced from, the threaded opening 27 in the front plate 21. Thus, any light passing through the optical system 41 and the telescopic focusing device 29 will strike the photoelectric tube 43 with the optimum effect. It will be understood that the phototube 43 may be replaced by any light responsive electrical device capable of functioning similarly and that the references herein to a "photo tube" are solely for illustrative purposes.

A scanning assembly 44 (Figures 3 and 4), which is substantially housed within the scanning disk housing 26, is comprised of a disk positioning portion 45, mounted on the back plate 22, and a disk gripping portion 46 axially slidably supported upon the front plate 21.

The disk positioning portion 45 of the scanning disk assembly 44 is comprised of a shaft support 47 (Figures 3 and 4) having a circular flange 48 which is snugly secured within an appropriate circular opening 49 in the back plate 22. The support 47 also has a shank 51 coaxial and integral with the flange 48, and extending forwardly therefrom into the scanning disk housing 26. The shaft support 47 is provided with a cylindrical shaft opening 53, which is coaxial with the shank 51 and through which the scanning disk shaft 52 is slidably receivable. Suitable bearings are held within the shaft support 47 at opposite ends of the cylindrical shaft opening 53 and rotatably support the scanning disk shaft 52, said shaft extending from both ends of said shaft support.

The forward end of the scanning disk shaft 52 (Figure 3) is preferably integral with a scanning disk support flange 54, which support flange engages one side of the scanning disk 55. The scanning disk 55 (Figures 3, 4 and 5) is preferably a flat circular film, of any appropriate type capable of carrying images and passing light therethrough, and having a pilot opening at its center. The scanning disk 55 extends substantially beyond the outer periphery of the scanning disk support flange 54, against which it bears. The scanning disk support flange 54 is provided with a pilot recess 56 (Figure 4) at the center of that side thereof remote from the scanning disk shaft 52.

In a manner hereinafter described in detail, the radially outer portion of the scanning disk 55, extending beyond the scanning disk support flange 54, is appropriately provided at equally spaced intervals with negative images of the particular label with which it is to be used in the inspecting operation.

That end of the scanning disk shaft 52 (Figure 3) which extends rearwardly beyond the circular flange 48 and the back plate 22 is counterbored to provide a motor shaft opening 57 therein. The motor shaft 58 of a conventional electric motor 59, which motor is resiliently mounted upon the circular flange 48, is slidably received into the motor shaft opening 57 and may be held therewithin by means of the set screw 61. The scanning disk shaft 52 is substantially horizontal and its axis preferably lies within the horizontal plane defined by the axes of both the photoelectric tube 43 and the telescopic focusing device 29.

The disk gripping portion 46 of the scanning disk assembly 44 (Figures 3 and 4) is supported upon the stub shaft 62, which stub shaft is slidably and rotatably supported within the cylindrical opening 63 in the stub shaft support sleeve 65. The said stub shaft support sleeve, which has a circumferential flange 64 intermediate its axial extremities, is snugly received through an appropriate opening in the front plate 21, which opening is coaxial with the cylindrical shaft opening 53 in the shaft support 47. The circumferential flange 64, which bears against the front surface of the front plate 21 may be secured thereto by any convenient means such as bolts.

The inner, or back, end 63*a* of the cylindrical opening 63 in the stub shaft support sleeve 65 is of greater diameter than the outer, front end thereof, thereby providing a shoulder 66 within said opening 63 intermediate the axial extremities thereof. That end of the stub shaft sleeve 65 extending within the scanning disk housing 26 is externally threaded for engagement by an appropriate lock nut 67 for purposes hereinafter disclosed.

The stub shaft 62 is provided with an integral, circumferential thrust ring 68 near its inner end 69 (Figure 3), which inner end is engaged by the inner race of an appropriate antifriction bearing 71 whose other race is engaged by and supports a circular pressure flange 72. The pressure flange 72, which is preferably of approximately the same diameter as the scanning disk support flange 54 and coaxial therewith, is provided with a pilot 73 at its center on the side thereof adjacent to the said disk support flange 54 for cooperation with the pilot recess in said disk support flange.

A pressure flange spring 74, which is sleeved upon the stub shaft 62, is held under compression between the internal shoulder 66 in the stub shaft support sleeve 65 and the thrust ring 68. The said pressure spring 74, a portion of which extends within the support sleeve 65, tends to urge the stub shaft 62 rearwardly, thereby urging the pressure flange 72 firmly and tightly against the scanning disk support flange 54, which flange is prevented by the shaft support 47 from moving rearwardly.

That end of the stub shaft 62 extending forwardly from the stub shaft support sleeve 65 is externally threaded for appropriate engagement by a control knob 75. Thus, manual movement of the control knob 75 axially forwardly (Figure 4), or away from, the front plate 21, thereby compressing the pressure spring 74 between the thrust ring 68 and the shoulder 66 of the support sleeve 65, moves the pressure flange away from engagement with the support flange 54. At the same time, the pilot 73 is removed from the pilot recess 56 thereby permitting the insertion of an appropriate scanning disk 55 between the disk support flange 54 and the pressure flange 72. When the control knob 75 is released, the pressure spring 74 urges the stub shaft 62 leftwardly until the scanning disk 55 is firmly gripped between the pressure flange 72 and the disk support flange 54. The pilot 73, which slides through an appropriate opening at the center of the scanning disk 55, re-engages the pilot recess 56. A pair of scanning disk guides 76 (Figures 3 and 5) are secured to the rear surface of the front plate 21 for the purpose of guiding the scanning disk 55 into place on initial placement thereof between the flange 54 and the flange 72 with the opening in the center of said scanning disk in registry with the pilot 73 and pilot recess 56.

Figure 6:
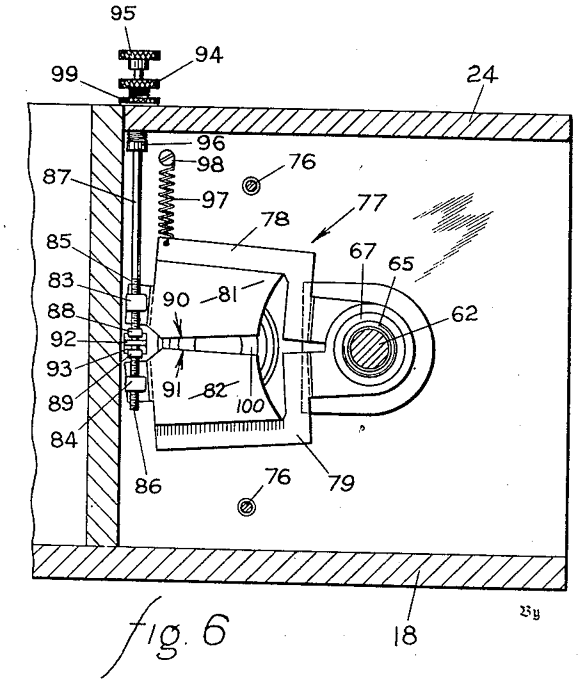
Figure 6 is a sectional view taken along the line VI—VI of Figure 4.
Figures 7, 8, 9:
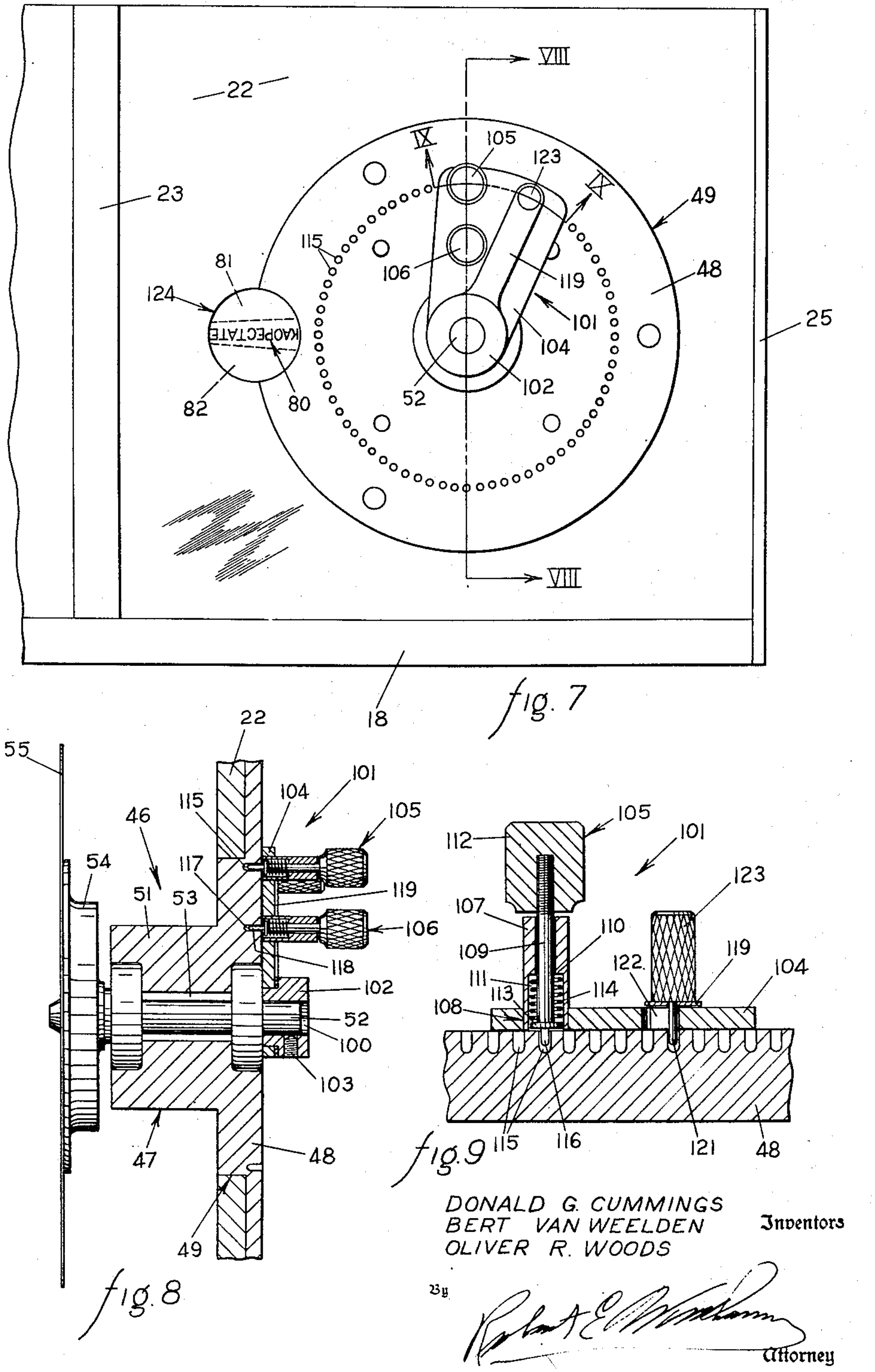
Figure 7 is a side elevation view of the inspection head scanning housing with the motor removed and the scanning disk indexing device in operative position.
Figure 8 is a sectional view taken along the line VIII—VIII of Figure 7.
Figure 9 is a sectional view taken along the line IX—IX of Figure 7.

The aperture control assembly 77 (Figures 4, 5 and 6) is comprised of an upper element 78 and a lower element 79 having similar, circular openings at one end of each whereby said elements are pivotally sleeved upon the inner, threaded end of the stub shaft support sleeve 65. The lock nut 67 which threadedly engages the inner end of said support sleeve 65 holds the said elements on said support sleeve. The upper and lower elements 78 and 79 are provided with flat, vertical, coplanar light interceptor plates 81 and 82, respectively, for controlling the extent to which said scanning disk 55 is exposed to the light passing through the telescopic focusing device 29.

The disposition of the opposed edges 90 and 91 (Figures 5, 6, 15, 16 and 17) of the light interceptors 81 and 82, respectively, with respect to each other is extremely critical to the most satisfactory operation of the inspection device, as will be disclosed in detail hereinafter.

It has been found that the angular relationship and distance between the opposed edges 90 and 91 of the interceptors 81 and 82 directly controls the intensity of the light passing through the focusing device 29 and striking the photoelectric tube 43, and, therefore, affects the current output of the said tube 43. It has been found that the outer ends 90*a* and 91*a* (Figure 5) of said opposed edges, which ends are remote from the axis of the scanning disk 55, are preferably positioned closer together than the inner ends 90*b* and 91*b* thereof. However, the inspection device will operate, although somewhat less efficiently, when the opposed edges 90 and 91 converge toward their inner ends 90*b* and 91*b*, which latter arrangement includes having said edges aligned radially of the disk 55.

The opposed edges 90 and 91 are sufficiently spaced from each other that an image of the marking being inspected can completely enter the aperture 100 (Figure 5 and 15) between said edges. The facsimiles 80, which are spaced at equal intervals around said scanning disk 55 (Figure 12), are preferably so positioned with respect to said opposed edges that at least a part of one facsimile (Figures 15, 16 and 17) is in the aperture 100 between said opposed edges at all times. Thus, at least some light is permitted to pass through the scanning disk at all times for reasons dealt with in detail in the operation of the device. The facsimile 80 in this embodiment is a transparency in an opaque background as shown in Figure 13.

It has been found particularly advantageous to have slightly less than one half of one facsimile remaining within the aperture 100 (Figure 17) when the next succeeding facsimile begins to emerge into said aperture.

In one operationally satisfactory arrangement of the aperture control assembly 77 and the scanning disk 55, there were 72 photographic facsimiles of the word "Kaopectate" around a scanning disk having a 6 inch diameter. The facsimiles were radially disposed upon said disk near the outer edge thereof and spaced equidistantly from each other. The overall maximum height of the letters in each facsimile was 0.084 inch and the facsimiles were 0.364 inch long. The approximate ratio between the height of the letters on the label and the letters in the facsimile was 4.38 to 1, respectively. The disk was rotated at a speed of 30 revolutions per second so that approximately 2,160 facsimiles passed the aperture during each second.

The opposed edges 90 and 91, which were directly opposite each other and 0.406 inch long, were positioned so that their inner ends 90*b* and 91*b* were 0.140 inch apart and their outer ends 90*a* and 91*a* were 0.100 inch apart. The upper edge 90 was inclined at an angle of about 3 degrees to a radius through its mid-point and the lower edge 91 was inclined at an angle of about 2 degrees to a radius through its mid-point. It is believed that the exact position of the opposed edges 90 and 91 with respect to each other as well as the horizontal is dependent to an appreciable extent upon the shape and configuration of the marking being inspected. While for a fixed machine, these edges may be fixed with respect to each other, as required, in the embodiment herein being described they were made adjustable to meet varying operating requirements.

It was determined through experimentation that the angular disposition of the edges 90 and 91 for optimum operation of the inspection device under the above mentioned conditions was limited for each of said edges to a range of from a radial alignment to one at an angle of about 3½ degrees from the radius cutting the mid-point of each thereof. It was also found that due to the closeness of the inner ends of adjacent facsimiles, variations in the slopes of said edges were best accomplished by increasing or decreasing the distance between the outer ends 90*a* and 91*a* of said edges. It should be understood, however, that these quantitative values are merely illustrative being derived primarily from the word "Kaopectate" and with respect to other indicia, and they are to be taken as suggestive only.

Decreasing the distance between said outer ends was limited by the marking itself, which marking must be completely visible within said aperture 100 for at least a short period of time as it passes therethrough. Increasing the distance between the said outer ends was limited by the electrical system. It was found that as either of the opposed edges 90 and 91 began to approach parallel to a radius of the scanning disk 55, the emergence and disappearance of a facsimile beneath a light interceptor was so abrupt that it sometimes caused the electrical system to transmit a pass signal. Accordingly, the edges 90 and 91 are preferably, but not necessarily, positioned so that one end, here the outer end, of the facsimile precedes the inner end thereof in emerging from behind one interceptor or disappearing behind the other and thereby positively prevents an abrupt rate of change in intensity which could produce a pass signal. Such emergence and disappearance produces a rise and fall in intensity about as shown in the curve X (Figure 14). It is, of course, conceivable that the electrical system could be constructed sufficiently sensitive to distinguish accurately between such emergence and disappearance, on the one hand, and coincidence, on the other hand, and thus facilitate the use of radially aligned aperture edges and such would be within the scope of this invention. However, this is difficult and the structure described is preferable.

Those ends of the elements 78 and 79, remote from the support sleeve 65 and adjacent to the wall 23, pivotally support a pair of pivot nuts 83 and 84 (Figure 6), respectively, one each of said elements. The pivot nuts 83 and 84 are threadedly engaged by the upper and lower threaded portions 85 and 86, respectively, of the adjustment rod 87. Said upper and lower threaded portions are threaded in opposite directions so that rotation of the adjustment rod 87 in one direction causes the elements 78 and 79 to move vertically away from each other, and rotation of the adjustment rods in the opposite direction causes the said elements to move toward each other.

The adjustment rod 87 is provided with a pair of spaced, circumferential, stop rings 88 and 89 between the upper and lower threaded portions 85 and 86, thereof. The adjustment rod 87 is slidably engaged between the stop rings 88 and 89 by an appropriate opening in the horizontal flange 92 of a fixed bracket 93 which bracket is secured to the rear surface of the front plate 21 adjacent to the end plate 23. The horizontal flange 92, which slidably engages the adjustment rod 87, preferably lies substantially within the horizontal plane including the axis of the support sleeve 65. Therefore, when the stop rings 88 and 89 are vertically spaced equidistant from said horizontal flange 92, the opposing edges 90 and 91 of the light interceptors 81 and 82, respectively, may be brought together by appropriate rotation of the adjustment rod 87 at a point lying substantially within said horizontal plane including the axis of said support sleeve 65.

The adjustment rod 87 (Figures 2 and 6) extends upwardly and slidably through an appropriate opening in an externally threaded adjustment sleeve 94, which sleeve threadedly engages and extends through an appropriate threaded opening in the top plate 24. The adjustment rod 87 is slidably supported within said adjustment sleeve 94. The adjustment sleeve 94 may be moved upwardly or downwardly with respect to the top plate 24 by appropriate rotation thereof. A lock nut 99 may be provided to fix the position of said adjustment sleeve 94 with respect to the top plate 24 at any desired or required position. The adjustment rod 87 is provided with a turning knob 95 by means of which said adjustment rod may be rotated within said adjustment sleeve 94. Said adjustment rod is also provided with a stop collar 96, adjacent to the lower edge of the adjustment sleeve 94, which stop collar limits the upward movement of the adjustment rod 87 with respect to the adjustment sleeve 94.

The upper edge of the upper element 78 is engaged at a point adjacent to the adjustment rod 87 by the lower end of an adjustment spring 97 whose upper end is preferably anchored on the rear surface of the front plate 21 by any suitable means, such as an anchor bolt 98. The adjustment spring 97, which is held under continuous tension, accordingly tends to urge the stop collar 96 on the adjustment rod 87 firmly against the lower edge of the adjustment sleeve 94. It will be observed that the entire aperture assembly 77 may be pivoted upon the support sleeve 65, within the limit of the space between the stop rings 88 and 89, by appropriate adjustment of the adjustment sleeve 94 with respect to the top plate 24.

The light interceptors 81 and 82 (Figure 2) are recessed rearwardly so that they are as close to the scanning disk 55 as practicable, thereby reducing the effects of the diffraction of the light passing through the telescopic focusing device 29 around the opposed edges 90 and 91 of the said interceptors.

*Scanning disk indexer*

The scanning disk 55 (Figure 5) is provided with a plurality of spaced, photographic negative facsimiles 80 of the label to be inspected, said facsimiles being positioned radially around that portion of the disk 55 extending beyond the pressure flange 72. Each photographic facsimile of the label appearing upon the scanning disk must be produced by photographically exposing said portion of the said disk, which portion is accordingly suitably sensitized.

It will become apparent that the accuracy of spacing the individual photographic facsimiles of the label equidistantly from each other about the scanning disk is extremely important. Therefore, a scanning disk indexing assembly (Figures 7, 8 and 9) may be provided for attachment to that end of the scanning disk shaft 52 extending rearwardly through the back plate 22, for obtaining accurate exposure of the scanning disk 55. The motor 59 is removed from said back plate 22 and from engagement with the scanning disk shaft 52 when the scanning disk indexing assembly is positioned upon said shaft. The indexing assembly 101 is attached to the inspection head 10 only when a new scanning disk is to be exposed.

The indexing assembly 101 makes possible the accurate photographic exposure of the scanning disk 55 at spaced intervals around its periphery in complete darkness and without requiring any other special equipment. It is, however, auxiliary equipment which may be omitted without detracting from the main purpose of the invention.

The said indexing assembly, where used, may be comprised of a cylindrical hub 102 (Figure 8) having an opening 100 for engagement of the scanning disk shaft 52 and a set screw 103 for locking said hub to said shaft. An indexing plate 104, which is slightly longer than wide, is secured at one end to said hub 102. The index plate 104 is provided with a pair of spring loaded, substantially identical, positioning pin assemblies 105 and 106 which are radially aligned with respect to the axis of the hub 102. Accordingly, the following detailed description, which is given of one positioning pin assembly, may be taken to apply in substance to both positioning pin assemblies.

The positioning pin assembly 105 (Figure 9) is comprised of a cylindrical plunger body 107, which is substantially perpendicular to the index plate 104 and one end of which is fixedly held within a suitable body opening 108 in said index plate. A cylindrical opening 111 is provided through the cylindrical body 107 and coaxial therewith, which opening is of slightly larger diameter at the end thereof secured to the index plate 104, thereby providing an internal shoulder 110. The plunger rod 109, which is slidably received through the cylindrical opening 111, extends beyond both ends of said body 107 and, therefore, through the index plate 104.

A plunger head 112 is secured to that end of the plunger rod 109 extending from the end of the body 107 remote from the index plate 104. A circumferential thrust ring 113 is secured to the plunger rod 109 near the end thereof remote from the plunger head 112. A plunger spring 114 is sleeved upon the plunger rod 109 within the enlarged portion of the cylindrical opening 111 in the cylindrical body 107 and is held under compression between the thrust ring 113 and the internal shoulder of the body 107. Thus, the plunger spring 114 tends to urge the plunger rod 109 through the cylindrical body 107 toward the back plate 22, and the plunger head 112 limits the extent to which the plunger spring can so urge the plunger rod.

A plurality of equally spaced index holes 115 are provided in the circular flange 48 supported in the back plate 22, said index holes being equidistant from the axis of the hub 102. The circular centerline through said index holes 115 intersects the axis of the outer positioning pin 105. Thus, the index tip 116 of the plunger rod 109 on the outer positioning pin 105 can enter any one of the index holes 115. The said index tip 116 may be removed from an index hole by manually pulling the plunger head 112 away from the plunger body 107. When the plunger head 112 is released, the spring 114 urges the index tip 116 toward the circular flange 48.

An initial hole 117 (Figure 8) which is axially alignable with the index tip 118 of the inner positioning pin assembly 106, is provided in the flange 48 preferably directly above the scanning disk shaft 52. Thus, the index tip 118 may engage the initial hole 117 once during each 360 degree rotation of the indexing assembly 101 with the disk shaft 52.

A flexible index arm 119 (Figures 7 and 9), which is rotatably supported at one end upon the hub 102, is provided at its free end with an index pin 121 which pin extends through an appropriate, arcuate index slot 122 in the index plate 104. The said index slot 122 has a longitudinal centerline which substantially coincides with an arc of the said circular centerline of the index holes 115 in the back plate 48 and is preferably slightly longer than the distance between one side of one index hole and the opposite side of an adjacent index hole. Thus, the index slot 122 can be positioned with respect to the index holes 115 so that the index pin 121 may enter either of two adjacent index holes, but no more than two, without moving the index plate 104. An index arm knob 123 is secured to that end of the index arm 119 provided with the index pin 121 so that the index pin 121 may be removed from a particular index hole 115 by springing the index arm 119 away from the index plate 104.

The index tip 118 of the inner positioning pin assembly 106 is preferably seated within the initial hole 117 at the beginning of a cycle of exposing a scanning disk 55 to a particular label. The index tip 116 of the outer positioning pin assembly 105 is seated within that index hole 115 aligned with the initial hole 117 and the axis of the hub 102. The index pin 121 at the end of the index arm 119 is inserted into the index hole 115 at that end of the index slot 122 remote from the outer positioning pin 105. The scanning disk 55 may then be given its first exposure of the particular desired label. It will be understood that the light interceptors 81 and 82 of the aperture assembly 77 will be appropriately positioned to limit the area of exposure on the scanning disk 55.

At the completion of the first exposure of said scanning disk, the index tips 116 and 118 of the outer and inner positioning pins 105 and 106, respectively, are removed from the index hole 115 and initial hole 117, respectively, by pulling the respective plunger heads 112 away from the bodies 107. The index plate 104 may then be moved clockwise (as appearing in Figure 7) until that end of the index slot 122 adjacent to the outer positioning pin 105 engages the index pin 121. When the plunger head 112 of each pin assembly is released, the index tip 116 enters the next, adjacent index hole 115, but the index tip 118 merely bears against the surface of the circular flange 48 since there is only one initial hole 117. The index tip 121 is then removed from the index hole 115, which is now adjacent to that hole occupied by the index tip 116, and is moved away from the outer positioning pin 105 to the opposite end of the index slot 122 and inserted in the next clockwise adjacent index hole 115. The indexing assembly 101 and the scanning disk 55 are now properly positioned for the next exposure of the said label thereon. At the completion of such exposure further appropriate movement of the index plate 104, as above described, may take place and the cycle repeated.

The steps comprising movement of the index plate 104 as far as the index slot 122 and the index pin 121 will permit, exposure of the scanning disk 55, and then movement of the index pin to the opposite end of the index slot to complete an exposure cycle, may be continued until the scanning disk assembly 101 has made a complete rotation and the index tip 118 once again returns to the initial hole 117.

A circular inspection port 124 (Figures 2 and 7), which is provided in the back plate 22, is coaxial with the circular threaded opening 27 in the front plate 21 which supports the telescopic focusing device 29. An inspection plug 125 which normally closes the inspection port 24 may be removed for purposes of visually inspecting the alignment and accuracy of the photographic facsimiles of the label around the scanning disk 55.

*Pass mechanism*

The pass mechanism 13 (Figures 1 and 11) is comprised of a reject arm 130 which is pivotally supported near one end thereof upon the conveyor table 11 adjacent to the conveyor belt 12. The end 131 of the reject arm 130 remote from the pivot point 132 is preferably curved toward the conveyor belt 12 in such a manner that when said reject arm is across the conveyor it will direct containers having defective labels off the conveyor belt and onto the table. That end of the reject arm 130 nearest to the pivot point 132 is engaged by a resilient means such as a reject spring 133 which is anchored upon the conveyor table 11 and tends to hold the curved end 131 of the reject arm 130 across the conveyor belt 12 in the path of the bottles 14.

The reject arm 130 is pivotally engaged intermediate the pivot point 132 and the curved end 131 by the actuating arm 134 of an appropriate solenoid 135 which solenoid is supported upon the conveyor table 11. Appropriate electrical energizing of the solenoid 135 causes the actuating arm 134 to move the curved portion 131 of the reject arm out of the path of the labeled bottles 14 being moved upon the conveyor belt 12. The reject spring 133 tends to hold the reject arm 130 in the path of said bottles and will return the reject arm to that position as soon as the solenoid releases its hold upon the actuating arm 134.

The electrical device, comprising the photoelectric unit 15 and the power control units 17 and 19, effects actuation of the solenoid 135 to permit a given bottle to pass each time a correct label is detected by the inspection head 10, as is hereinafter disclosed in detail. Of course, any of several known types of electrical equipment and circuits may be employed for this purpose, provided only that they are capable of functioning as hereinafter described. A source of light, such as the lamp 136, may, if needed, be placed upon the conveyor table 11 adjacent to the inspection head 10 to increase the intensity of light being reflected from the labeled bottle 14 through the optical system 41 and into the inspection head 10.

It will, of course, be understood from the foregoing that a variety of mechanical, or other, operations may be performed by the electrical impulse passing the high-pass filter in addition to, or in place of, the withdrawing of the reject arm 130. For example, the device may actuate a counter in addition to said reject arm, or the device may be utilized to actuate a camera shutter for photographing the particular objects, out of a miscellaneous group, having certain selected appearance characteristics.

*Mechanical operation*

The inspection head 10 is positioned adjacent to a conveyor belt 12 so that the optical device 41 may be focused upon a point above said belt through which the marking on said labeled bottle 14 will pass. The optical device 41 is positioned with respect to the scanning disk 55 so that when the optical device is thus focused, the reflected images of said markings passing through the optical system will be of the same size, in the plane of the scanning disk, as the transparent facsimiles of said marking on said disk. Thus, a bottle having a proper marking thereon will, in one position along said conveyor, be disposed so that the reflected image of a marking passing through the optical system will coincide substantially completely with one of said transparent facsimiles. The pass mechanism 13 is placed adjacent to said belt, near said point, so that the curved end 131 of the reject arm normally extends across said belt 12 on that side of said point toward which said belt moves. The scanning disk 55 having the proper facsimiles of said marking about its periphery is placed between the support flange 54 and the pressure flange 72.

Light produced by the source 136 is reflected from the label on the bottle 14, as said label passes through said point, into the optical device 41 and between the shutters 78 and 79 where it is interrupted by the rotating disk. As the negative facsimiles on the otherwise completely opaque disk intercept the path of said reflected light, they permit a portion of said light to pass through said disk and fall upon the photoelectric tube 43 as a beam of regularly varying intensity.

The light passing through the negative facsimile in said disk is thus varied in intensity at a certain, substantially steady, rate of change as said images are rotated at a constant speed into and out of light passing position between said shutters 78 and 79. This rate of change is transformed into a rate of change of current output from said photo-tube, the normal pulsation mentioned above, which is selectively rejected by the high-pass filter 140. However, when the marking on the labeled bottle 14 coincides with a negative facsimile thereof on the disk 55, a very material and abrupt change in intensity of light reaching said photo-tube is effected. This rate of change, which is much more sudden than said first mentioned rate of change, produces a current, the signal pulsation mentioned above, which is not stopped by said filter 140 and, therefore, effects the transmission of a signal pulsation to the pass mechanism 13 whereby the reject arm 130 is withdrawn from across the belt 12. Thus, coincidence between a negative facsimile of a marking on said disk and the said marking on a labeled bottle, passing through said point, produces an electrical impulse which removes the reject arm from the path of this particular bottle. A time delay relay, interposed into the electrical system, limits the time during which said arm is being so retracted to a period sufficient only to permit the passage of said particular bottle.

To consider the operation in more detail, the inspection head 10 is preferably positioned so that the axis of the telescopic focusing device 29 is substantially horizontal and perpendicular to the path of the marking, or word, on the labeled bottles 14 being conveyed on the belt 12. The labeled bottles are preferably positioned on said conveyor belt so that their labels squarely face the focusing device 29 as they pass thereby. The pass mechanism 13 is positioned with respect to the belt 12 and the axis of the telescopic focusing device 29 so that the reject arm 130 extends across said belt and will intercept all bottles, not having satisfactory labels, before said bottles get completely by said focusing device 29. Thus, if a mechanical or electrical failure occurs, all bottles will be automatically rejected by said reject arm 130.

The scanning disk 55, which is placed between the disk support flange 54 and the pressure flange 72, is preferably rotated by the electric motor 59 at a high speed so that many photographic facsimiles of said marking will intercept the light passing through the focusing assembly while one marked bottle passes between the inspection head 10 and the pass mechanism 13. The photographic facsimiles of the label are so positioned on the scanning disk 55 that they pass directly between the photoelectric tube 43 and the circular threaded opening 39 in the front plate 21. Thus, if the marking is correct and the label correctly placed, at least one of the photographic facsimiles on the scanning disk will register with the marking on the labeled bottle as said bottle passes the inspection head. The spacing between the light interceptor opposed edges 90 and 91 of the aperture assembly 77 is controlled by the adjustment rod 87 and the parts associated therewith, according to the requirements in any given instance.

By way of example, in one satisfactory arrangement of the aperture control assembly 77 (Figures 5, 6, 15, 16 and 17) the mean distance between the opposed edges of the light interceptors 90 and 91 was 0.120 inch. The said opposed edges converged toward a common point remote from the axis of the scanning disk 55.

Figure 16:
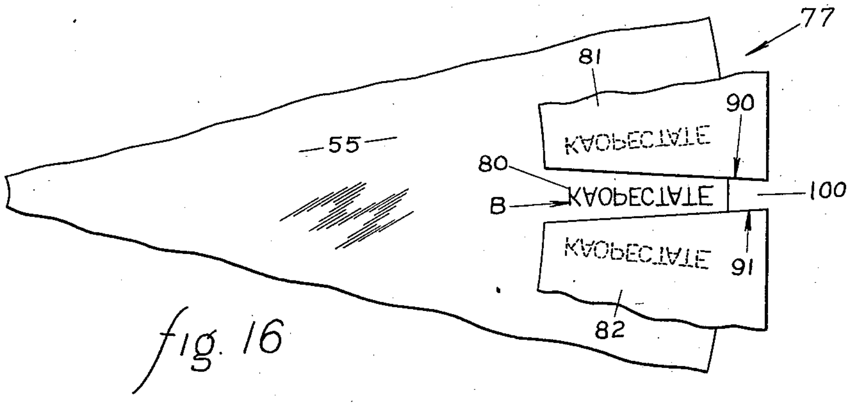
Figures 16 and 17 are further fragmentary, front, elevation views of said scanning disk and light interceptors.
Figure 17:
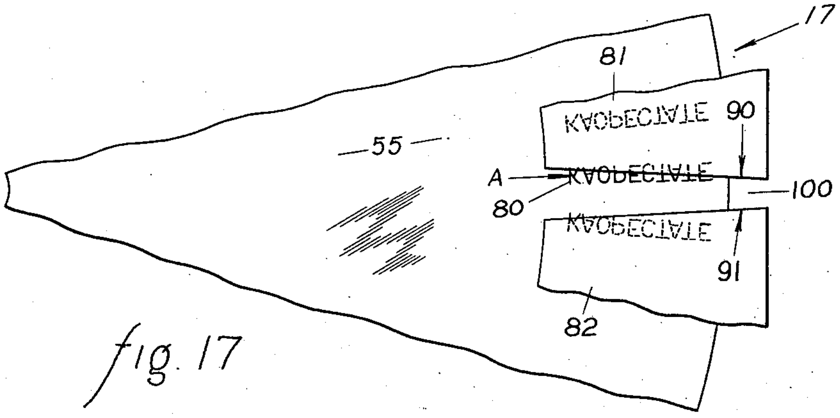
Figure 15:
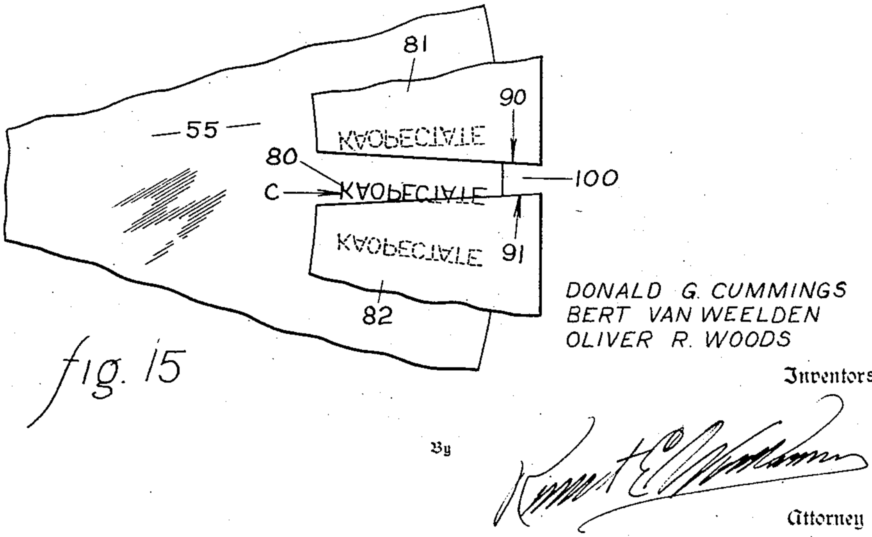
Figure 15 is a fragmentary, front elevation view of the scanning disk and a pair of light interceptors.

Referring to Figures 15, 16 and 17, which illustrate the above mentioned arrangement, it will be observed that, as the disk rotates, the facsimiles 80 emerge progressively from behind the lower light interceptor 82 and disappear progressively behind the upper light interceptor 81. Since the scanning disk 55 is in effect a photographic negative and a wholly opaque area lies between the facsimiles, the maximum amount of light passes through the scanning disk 55 only when a single facsimile 80 lies wholly between the opposed edges 90 and 91 and thus completely within the aperture 100. The facsimiles on said scanning disk (Figure 12) are preferably so positioned and the opposed edges 90 and 91 of the light interceptors are so spaced that one facsimile is slightly more than half way (Figure 17) behind the upper interceptor 81 before the next adjacent facsimile appears from behind the lower interceptor 82. There is preferably some light passage through the scanning disk at all times that there is not a complete registration between a facsimile 80 and the corresponding marking on the label for reasons which will hereinafter become apparent.

In order to transmit a signal pulsation through the electrical system and thereby permit a correctly marked bottle to escape the reject arm 130, two conditions must be satisfied in this embodiment. In the first place, a very substantial portion of the light which can pass through an image must be blocked out by proper registration between a facsimile and the marking on the bottle being inspected. It will be seen that a facsimile must be substantially centered within the aperture 100 when the marking passes the focusing device 29 to effect such registration. If the facsimile is either a little high or a little low, a portion of it will be covered by one light interceptor and a portion of the adjacent facsimile will be protruding from beneath the other light interceptor, thereby permitting more than the minimum permissable amount of light to reach the photo-tube. The registration of the marking with a negative facsimile produces a "black-out" on the photo-tube because the marking absorbs the light which would normally pass to the phototube through the transparent facsimile (Figure 13). Since the general method and means for obstructing light passage by registering a reflective or non-reflective object with a negative facsimile of said object is well known in the art, further details thereof will be omitted.

In the second place, the said "black-out" must be accomplished much more rapidly than the rate at which the light intensity varies as a result of the facsimiles passing into and out of position within the aperture 100. The high-pass filter 140 (Figure 10) is adjusted to block the normal, or primary, current pulsations from the phototube 43 resulting from the normal passing of the negative facsimile across said aperture 100 as detailed elsewhere herein. The electronic circuitry following the filter is adjusted to be insensitive to secondary pulsations resulting from partial registration between said facsimiles 80 and said markings, which partial registrations may be produced as a given marking approaches, or moves away from, a portion of complete registration as well as by or during other instances where the facsimiles come close to registration but do not fully attain it for any of several reasons. Thus, said filter, in combination with the succeeding electronic circuitry, is preferably adjusted to deliver as signal pulsations only those pulsations, or rates of change, which result from registration between facsimiles and markings which are substantially complete.

The current output of the photo-tube 43, in this particular embodiment, varies directly with the light intensity striking the photo-tube. The particular arrangement of the opposed edges 90 and 91 hereinabove described, produces a variation in the current output of the photoelectric cell, which, when plotted against a time axis, produces a sinusoidal curve X (Figure 14).

Position A on said sinusoidal curve X (Figure 14) represents the condition of light intensity when the scanning disk 55 and aperture 100 are positioned with respect to each other as shown in Figure 17. At this position the photoelectric tube is being exposed to a minimum light intensity and, therefore, a minimum of current flows from said photo-tube. Position B on said curve X corresponds to the relationship between the scanning disk 55 and aperture 100 shown in Figure 16, when there is no image registry at all, at which time the current output from the photo-tube is at a maximum. Position C on said curve X corresponds to the relationship between said disk 55 and aperture 100 shown in Figure 15, when the current output is between maximum and minimum values. Thus, the portions of the curve X indicated at A, B and C represent the fundamental phototube output resulting solely from the light variations caused by the facsimiles on the scanning disk, when such portions are unaffected by any lightblocking due to markings on bottles.

An intensity peak B in the curve X is produced each time a facsimile 80 passes the aperture 100, and there are about 2160 such peaks each second in the embodiment herein described. Although it has been found that the inspection device will operate satisfactorily under most conditions at a considerably lower frequency of intensity peaks, it will be recognized that the larger number improves the accuracy of operation.

The changes in the phototube output, due to partial or total coincidence of the image reflected from the marking on the bottle with one transparent facsimile, which are indicated by the dips E and D, respectively, in the curve X (Figure 14), will now be considered. In this particular embodiment the image is negative, since the marking tends to absorb light.

The rate of change in intensity necessary to transmit a single pulsation can be produced only when a facsimile is substantially centered within the aperture 100. Accordingly, it will be seen that the "black-out," and hence a sufficiently rapid fall and rise in intensity to pass the filter, must come approximately at a peak B in the curve X. This improves its ease of identification. The transmission of the signal pulsation through the electrical system and the consequent operation of appropriate relays causes the solenoid 135 to withdraw the reject arm 130 (Figure 1) from the path of the bottle 14 having the marking whose reflected image registered with the facsimile 80 whereby the pass signal was initiated. The normal peaks B in the curve X are indicated by a broken line B, where the dips D or E occur, for the purposes of comparison.

Thus, the normal change in intensity shown in curve X (Figure 14) between A and B does not initiate a signal pulsation to the solenoid 135. However, the sudden, sharp rate of change in intensity, provided it is of a predetermined minimum magnitude, such as indicated at D and resulting from a substantially complete registration between the reflected image of the marking and a facsimile thereof on the disk, will be translated by the electrical system into an actuation of said solenoid 135. Since at least a portion A (Figure 17) of a facsimile preferably lies between the edges 90 and 91 at all times, in the preferred embodiment there is always some light reaching the photocell 43, except when coincidence occurs. Thus, the dip D resulting from such coincidence will approach the time axis more closely than the lower lobes of the sinusoidal curve X as shown in Figure 14. When less selectivity is required, the minimum, or threshold, magnitude of impulse required may be diminished so that it appears, for example, at line "*y*" in Figure 14. Thus, smaller pips, resulting from less complete coincidence, will also actuate the mechanism but the basic pulsations (curve X) will still not actuate it due to their slower rate of change in intensity.

As a particular bottle moves into line with the focusing device 29 (Figure 1), the marking thereon, although not yet in registration with the facsimile, begins to absorb some of the light, which would otherwise be reflected off the bottle through said facsimile, and thereby produces the smaller dips E in the curve X. This semi-absorption continues to increase until substantially complete registration takes place and a signal pulsation is transmitted. Said absorption then decreases until the bottle passes out of line with the focusing device 29. This semi-absorption of light by the marking has the effect of a partial registration and, therefore, produces dips E of varying magnitude in the peaks B of the curve immediately before and after that peak at which the dip D occurs which is a result of a substantially complete registration of the reflection of the marking and a facsimile 80. There will be only one dip E or dip D in each peak B as shown, where such partial or complete registration, respectively, occurs.

It will be seen from the foregoing that as the dips E approach the magnitude of the dip D, the difference in rate of change of intensity or the difference in the intensity itself, either taken individually, would not in many instances be sufficient to be distinguishable by the electrical system. Thus, to secure the required selectivity in the electrical system, both the rate of change in intensity, as well as the actual amount of light, must both attain certain predetermined critical values to produce a signal pulsation. Since both of these functions occur at the same moment this high degree of accuracy is obtainable by wholly practicable apparatus.

By appropriate adjustment of the opposed edges 90 and 91 with respect to each other and to the scanning disk 55, the harmonic characteristics and curvature of the fundamental voltage wave shape, curve X (Figure 14) can be controlled. The physical and dimensional arrangement of the intercepters 81 and 82, hereinabove described by way of example, appeared to produce optimum conditions for inspecting the word "Kaopectate," and, in the light of the foregoing, can readily be modified to meet other words, figures and conditions.

*Mechanical modifications*

In the preceding description there has been shown and described in detail the mechanical portion of one preferred embodiment of an apparatus capable of carrying out the objects of the invention. It will be apparent, in the light of the foregoing, that there is a large number of other possible modifications which can be made in the described mechanical apparatus. For example, it will be recognized that any of the many forms of optical means can be employed for directing and focusing an image of the marking being inspected upon the plane of the scanning disk. It will also be apparent that a large number of variations can be provided in the mechanical apparatus by which the facsimiles, transparent or opaque, can be passed at a high rate of speed in the path of a light beam projected by the optical system. Figures 27, 28 and 29 illustrate diagrammatically three possible variations of such means which will all be within the broad concept of this invention, but each of which varies substantially in its physical parts and its mechanical operation from the preferred embodiment herein disclosed.

In Figure 27 there is shown an arrangement substantially similar to that appearing in Figure 11 wherein the rotating disk 55 has been replaced by a strip film **55*a* arranged in the form of an endless belt, driven by a suitable roller 300** whereby facsimiles on said film are caused to pass through the light beam at a high rate of speed. The theory of operating the scanning device and the manner of carrying it out may be exactly the same as described in detail above, where a circular scanning disk is used.

In Figure 28 there is shown a further modification wherein the rotating disk 55 is replaced by a sheet containing a single facsimile which sheet may be supported upon and vibrated, both horizontally and vertically if desired but at least vertically, or otherwise perpendicularly to the motion of the bottle on the conveyor, by actuating means 301 and 302, respectively, within its own plane. Such vibration will be at a sufficiently high rate of speed to cause the facsimile to intercept the light beam a very large number of times per second. This modification, also, is merely a variation in the mechanical means for causing a facsimile to intercept the light beam a very large number of times per second and effects no changes in the theory and operation of the scanning device as described above.

Figure 29 illustrates a somewhat different approach to the manner of interposing a facsimile in the path of the light emanating from the light source 136, but one which can still be utilized within the basic concepts of this invention. A rapidly rotating support 305 carries a plurality of positive facsimiles 306 of the marking to be inspected, which facsimiles may be duplicates of said marking. The light source 136 illuminates the facsimiles and is by them directed toward the conveyor as an image. Stray light so reflected will provide a general illumination of the bottle in regularly pulsating intensities to provide the same normal pulsation in photo-tube output as is provided in the preferred form above described. At a single, preselected, point the image reflected from a positive facsimile will coincide with the label on the bottle, if it is correct and correctly positioned and produce a pip in the photo-tube output which can then be utilized in the same manner as above described for the preferred form.

It will be noted that in the embodiment shown in Figures 1 to 17 the facsimiles are shown as moving in a direction perpendicular to the direction of motion of the conveyor. In Figures 27 and 29, the facsimiles are shown as moving parallel with the conveyor, although it would in these embodiments be entirely feasible to arrange the scanning means to provide for movement of the facsimiles perpendicular to the motion of the conveyor. In Figure 28 the facsimile is moving in both directions. While it may be normally preferable to have the facsimiles moving in a direction perpendicular to the direction of motion of the conveyor in order to provide the device with some degree of tolerance, these figures illustrate that in both horizontal and vertical directions, the basic principle of the invention may still be practiced with the movement of the facsimiles being in any direction provided only it lies in a plane parallel to the plane of the image projected from the marking being inspected.

Where movement of the conveyor and movement of the facsimiles are exactly parallel, there is then obtained tolerance only in a direction parallel to these movements, although by offsetting the facsimiles, as in the strip film case, to one side of the other of a centerline certain tolerances in a direction perpendicular to that of said movements may still be obtained.

Further, and as a matter entirely separate from the direction of movement of said facsimiles with respect to the direction of movement of the conveyor, it is preferable that in the case of elongated labels, as "Kaopectate" the facsimile pass the projected image in a direction parallel to its shorter dimension. In this way, registry of the facsimile and the image is more sudden and more sharp. If the facsimile passes in the direction parallel to the longer dimension, there will be more signals approaching close to the critical signal, especially if a label repeats a number of the same letters or other indicia, and the device will need to be more finely tuned. In the case of round or square indicia being inspected, it will make little difference. Thus, in the preferred embodiment where some tolerance is to be allowed both horizontally and vertically in the positioning of the labels on the bottles, it may be slightly preferable, and is so shown in the drawings, to pass the facsimiles in a direction perpendicular to the direction of movement of the conveyor and arrange the facsimiles upon their supporting means, as the disk, in such a way that they will pass the image in the direction parallel to the shorter dimension thereof.

*The electrical system*

Figure 10:
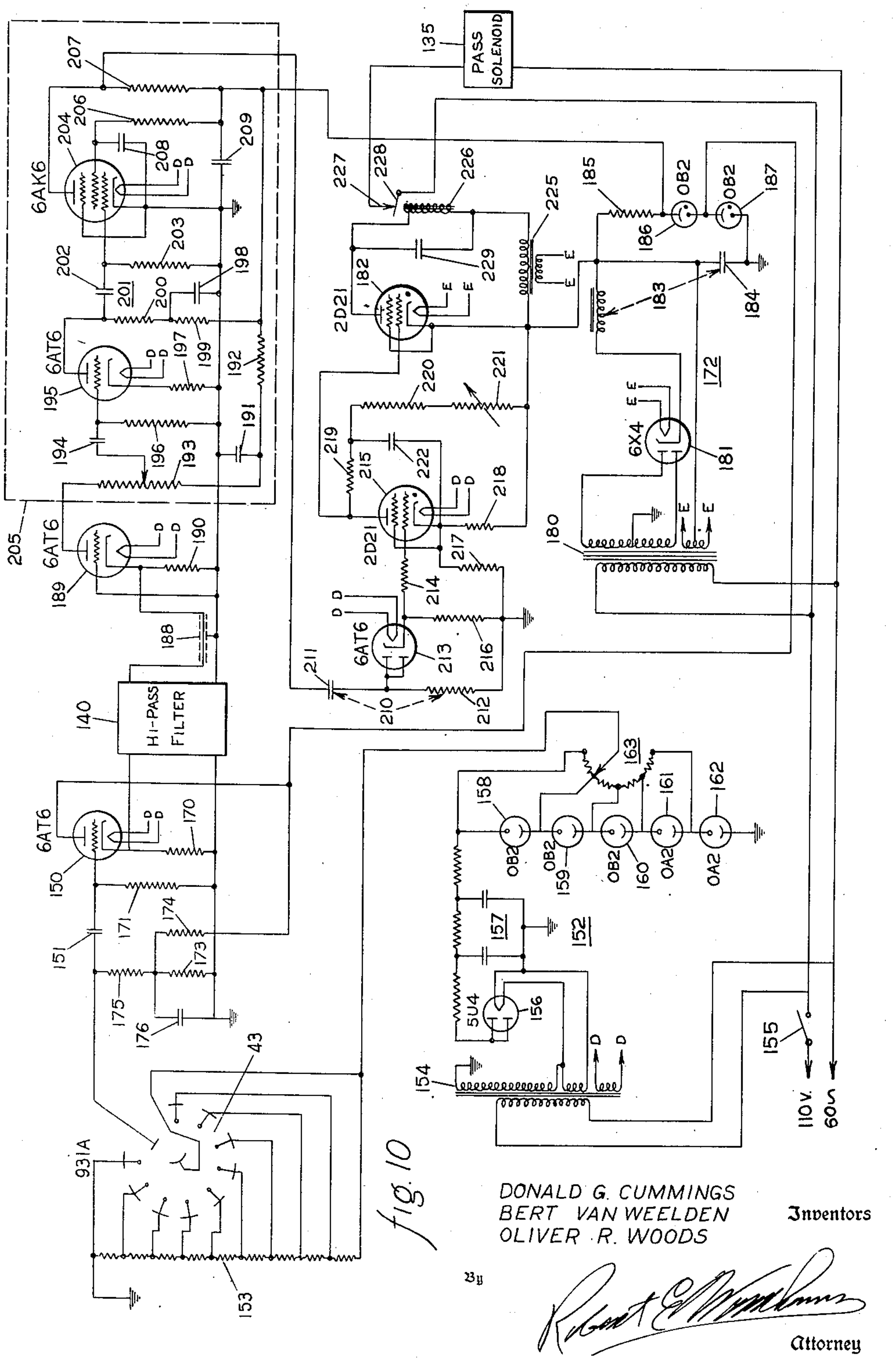
Figure 10 is a circuit diagram of the electrical system.

The electrical circuits employed in the preferred form of the invention are shown in Figures 10 and 11. Figure 10 is a detailed view of the circuits. Figure 11 is a view showing the circuits by the use of block diagrams, together with functional representations of the other elements which are shown in detail in Figure 1.

In Figure 10 is illustrated a photo-electric tube 43 of the electrostatically focused multiplier type having its collector anode connected to the grid of the high-mu triode 150 through coupling condenser 151 and its photo-cathode connected to a suitable value of negative potential supplied from a voltage-regulated power supply 152. The dynodes of the photo-tube, of which nine are shown, are connected conventionally to successive taps on resistance voltage divider 153, whose end terminals are connected to the same source of negative potential and to ground, respectively, in order to bias the nine dynode stages at successively increasing potentials lying between the maximum negative potential and ground. Photo-electric tube 43 may be a type 931A tube.

Power supply 152 has the primary winding of its power transformer 154 energized from a 110-volt, 60-cycle source through switch 155. The filament of the half-wave rectifier tube 156, which may be a type 5U4 tube with its two plates connected together, is supplied from a first low-voltage secondary winding of transformer 154, and the high-voltage secondary winding of the transformer is connected between one side of the filament of rectifier tube 156 and ground. A two-section $\pi$-type R. C. smoothing filter 157 is provided with the free terminal of the first resistance thereof connected to the two paralleled plates of rectifier tube 156, and the common terminals of the filter condensers are connected to the other side of the rectifier tube filament and to ground. The other free terminal of $\pi$-type smoothing filter 157 is connected to the plate of the uppermost of five gas-type voltage regulator tubes 158—162 connected in series to ground as shown. Tubes 158—160 may be type 0B2 tubes, and the tubes 161 and 162 may be type 0A2. The plate of each of the regulator tubes 158—162 is connected to a respective tap on the multi-position switch 163. The slider arm of switch 163, which thus provides a variable voltage in fixed steps, is connected to the photo-cathode of photo-tube 43 and to one end of voltage divider resistor 153, as described above. A second low-voltage secondary winding of transformer 154 supplies heater voltage for the majority of the tubes employed in this circuit, as indicated by the letters D—D applied to corresponding terminals, denoting connections not shown in detail in order to simplify the drawing.

The cathode of triode tube 150, which may be the triode section of a type 6AT6 tube, is connected to one input terminal of high-pass filter 140 and to ground through cathode resistor 170. The other input terminal of high-pass filter 140 is also grounded. Triode 150 thus functions as a cathode follower. Grid bias resistor 171 is connected between the grid of triode 150 and ground. The plate of triode 150 is supplied directly from a second regulated power supply 172 as shown, and this same potential is supplied to the anode of photo-tube 43 through the decoupling circuit including resistors 173, 174 and 175 and condenser 176.

Transformer 180 of power supply 172 has its primary supplied from the same 110-volt, 60-cycle source as power supply 152 through the same switch 155. Full-wave rectifier tube 181, which may be a type 6X4 tube, has its two plates connected respectively to the opposite ends of the center-tapped high-voltage secondary winding of transformer 180, and the center tap of the secondary winding is connected to ground. A center-tapped low-voltage filament secondary winding is also provided on transformer 180, and the voltage appearing across the ends thereof supplies the filaments of rectifier tube 181 and the tube 182 of the last stage of the circuit, as indicated by the letters E—E applied to their terminals. This last stage tube 182 also has its plate voltage supplied by induction through transformer 225 from the filament winding of transformer 180, as shown in the drawing. The cathode of rectifier 181 is connected to one terminal of single-section choke input filter 183 across whose condenser 184 is connected resistor 185 and gas-type voltage regulator tubes 186 and 187 connected in series as shown. Voltage regulator tubes 186 and 187 may be type 0B2 tubes. The junction of condenser 184 and voltage regulator tube 187 is grounded, and the junction of condenser 184 and the filter choke is connected to the center tap of the filament winding of transformer 180. The positive potential applied to the anodes of triode tube 150 and photo tube 43 as above-mentioned is obtained from the junction of voltage regulator tubes 186 and 187 and is thus a regulated potential.

High-pass filter 140 is designed to have a cut-off frequency at least equal to the frequency of wave X of Figure 14, or in the present embodiment, 2160 C. P. S. The output of high-pass filter 140 is connected through a shielded line 188 to the cathode of a second high-mu triode 189, which may also be the triode stage of a type 6AT6 tube. The cathode of this tube is connected to ground through resistor 190 and its grid is grounded, and hence tube 189 functions as a cathode-coupled amplifier. The potential appearing at the junction of resistor 185 and voltage regulator tube 186 is supplied through a de-coupling circuit, including condenser 191 and resistor 192, and the resistance of potentiometer 193 to the plate of triode 189. The slider arm of potentiometer 193 is connected through coupling condenser 194 to the grid of an inverter-amplifier triode 195. The grid of said triode 195 is connected through the resistor 196 to ground.

The cathode of triode 195, which may also be the triode stage of a type 6AT6 tube, is connected to ground through cathode resistor 197, and its plate supply is derived from the junction of resistor 185 and voltage regulator tube 186 through a de-coupling circuit, including condenser 198 and resistor 199 and plate resistor 200. The plate of the inverter-amplifier tube 195 is connected through a differentiating circuit 201, including condenser 202 and resistor 203, to the grid of a power pentode 204 which acts as a peak-sensitive detector. Differentiating circuit 201, peak-sensitive detector 204, and inverter-amplifier 195 together constitute a peak-sensitive circuit 205.

The magnitude of the signals applied to peak-sensitive circuit 205 is, of course, adjustable under the control of the position of the slider arm of the potentiometer 193. The suppressor grid and cathode of tube 204, which may be a type 6AK6 tube, are connected together and to ground, and the screen grid and anode of this tube are connected to the junction of resistor 185 and voltage regulator tube 186 through resistors 206 and 207, respectively. A by-pass condenser 208 is connected between the screen grid and ground, and de-coupling condenser 209 is connected between ground and the junction of the resistors 206 and 207.

The output of tube 204, taken from its plate, is connected through a second differentiating circuit 210, including condenser 211 and resistor 212, isolating diode 213, and resistor 214 to the control grid of a first grid-controlled tetrode gas-type tube 215. Diode 213, which may be the double-diode section of a type 6AT6 tube with its two diode plates connected together, has both its anode and cathode connected to ground through resistors 212 and 216, respectively.

The screen grid and cathode of tube 215, which may be a type 2D21 tube, are connected together and both are connected to ground through resistor 217, and to high-voltage terminal of condenser 184 through resistor 218. The anode of tube 215 is also connected to the high-voltage terminal of condenser 184 through fixed resistors 219 and 220 and variable resistor 221 connected in series, and condenser 222 is connected between the cathode 215 and the junction of fixed resistors 219 and 220. Tube 215 functions as a signal gate circuit, producing a voltage gate output whenever it is triggered "on" by an output from the preceding peak-sensitive detector tube 204.

The gate output of tube 215, taken from its plate, is directly connected to the control grid of a second grid-controlled tetrode gas-type tube 182, which may also be a type 2D21 tube, and which controls an acceptance control circuit including pass solenoid 135. The screen grid and cathode of the tube 182 are connected together to the high-voltage terminal of condenser 184 of power supply 172, and the cathode and anode of tube 182 are connected together through the secondary of transformer 255 and D. C. relay coil 226. The primary winding of transformer 225 is energized from the low-voltage filament winding of transformer 180 of power supply 172 as indicated by the letters E—E.

A large electrolytic condenser 229, whose capacity may be, for example, 16 microfarads, is connected in parallel with relay coil 226 to maintain the latter energized when tube 182 is "on" or conducting during the negative half-cycles of the plate voltage supplied by the secondary of transformer 225. Alternatively, the combination of D. C. relay 266 and condenser 229 might be replaced by an A. C. relay.

The contact 227 and armature 228 associated with relay coil 226 are normally closed and are connected in series with pass solenoid 135, switch 155, and the above mentioned 110-volt, 60-cycle source.

The details of operation of the circuitry of Figure 10 will be better understood by reference to Figure 11. In Figure 11 is shown in functional or block diagram form the detailed circuit of Figure 10 together with a functional representation of the other elements of the exemplified embodiment of this invention. The labeled bottles are carried from right to left (Figure 11) by the conveyor belt 12. Light emanating from the lamp 136 is reflected from the label on bottle 14 and passes through the scanning disk 55 before impinging upon the photo cathode of photo-tube 43. As described above, scanning disk 55 has spaced equidistant around it 72 transparent facsimiles of the marking being inspected on the bottle, and in one particular embodiment motor 59, rotated disk 55 at 1800 R. P. M. The resultant output from photo-tube 43 due to the interception by scanning disk 55 of the light falling upon the photo-tube is a 2160 C. P. S. substantially sinusoidal wave in the absence of registry of the image reflected from the marking being inspected on the bottle with one of the facsimiles on the scanning disk 55. This 2160 C. P. S. output is conveyed to high-pass filter circuit 140 through cathode follower 150 which, while not essential, is advisable in order to prevent the successive circuits from loading the photo-tube 43 and interfering with its normal operation.

Since high-pass filter 140 is designed to have a cutoff frequency at least equal to 2160 C. P. S., this normal 2160 C. P. S. sinusoidal output from photo-tube 43 cannot pass, and the only output from high-pass filter 140 occurs when the image from the marking on the labeled bottle 14 coincides with a negative facsimile thereof on the disk 55, producing the sudden signal pulsation above-mentioned and illustrated at D and E of curve X (Figure 14). These pulsations, having a greater rate of change in magnitude than the normal current pulsations, are passed by high-pass filter 140 and coupled through cathode-coupled amplifier 189 to inverter-amplifier 195 of peak-sensitive circuit 205. Cathode-coupled amplifier 189 is utilized in order to match the impedance of the shielded lead 188 coming from high-pass filter 140.

Peak-sensitive circuit 205 includes a differentiating circuit 201, a peak-sensitive detector 204, and an inverter-amplifier 195, which is utilized to amplify the pulsations and invert them for proper actuation of peak-sensitive detector 204. Note particularly that adjustment of the slider arm potentiometer 193 (Figure 10) determines the magnitude of the signal pulsation (such as D and E of curve X of Figure 14) which is inverted and amplified by inverter-amplifier 195. Differentiating circuit 201 differentiates the inverted input pulsations fed to it, such as inverted and amplified pulsations corresponding to those shown at D and E of curve X (Figure 14), and produces an initial positive trigger output whose magnitude is dependent upon the steepness of the slope of the leading edge. As the inverted and amplified pulsation passes through differentiating circuit 201, a succeeding negative trigger output is produced whose magnitude is dependent upon the steepness of the slope of the trailing edge of this pulsation. Peak-sensitive detector 204 has a zero bias applied to its grid, and this succeeding negative trigger output produces an extremely short duration pulse of positive amplitude at the plate of peak-sensitive detector 204. The preceding positive differentiated trigger output applied to the control grid of tube 204 will not produce any appreciable output in the plate circuit thereof because this tube is already conducting heavily due to its zero bias abovementioned. Peak-sensitive circuit 205 may be adjusted as described above by moving the slider arm of potentiometer 193 (Figure 10) so that an output is produced from peak-sensitive detector 204 only when at least 95% registry occurs between the marking on the bottle 14 and a facsimile on the scanning disk 55. Differentiating circuit 201 is included ahead of peak-sensitive detector 204 in order to distinguish between pulses such as D and E (Figure 14) if they are of the same magnitude but D occurs more suddenly or, in other words, has sharper leading and trailing edges.

This positive short duration pulse appearing at the plate of peak-sensitive detector 204 is further sharpened by passing it through the second differentiating circuit 210 before being passed through detector-diode 213, which passes only the positive sharpened pulse so produced by differentiating circuit 210.

This positive sharpened pulse appearing at the cathode of detector diode 213 is then connected to the control grid of signal gate circuit 215. This tube is biased below firing potential by the forced cathode biasing method or, in other words, the tube remains in a non-conducting state in the absence of a positive pulse applied to its control grid. Condenser 222 in the absence of such a signal charges up as determined by the difference in potential between the cathode of tube 215 (Figure 10) and the positive voltage applied to the plate thereof. When condenser 222 is charged up in this fashion, with tube 215 in the non-conducting or "off" state, acceptance control circuit tube 182 is conducting every positive half-cycle of the 60-cycle plate voltage because its grid bias, being derived directly from the plate of preceding gas tube 215, is zero relative to its cathode. This rectified current passed by acceptance control circuit tube 182 energizes relay 226, and condenser 229 shunting this relay maintains the latter closed during the negative half-cycle of the plate voltage. As pointed out above, alternatively the combination of the D. C. relay 226 and condenser 229 might be replaced by an A. C. relay.

When switch 155 is closed and relay 226 is thus energized due to acceptance control circuit tube 182 being conducting in the absence of a signal pulsation appearing at the control grid of signal gate circuit 215, relay contact 227 and armature 228 are maintained open and pass solenoid 135 is thus de-energized, and spring-biased reject arm 130 extends across and above the conveyor belt 12 in such a position that any bottle, such as 14, is deflected off the conveyor belt 12 so as to fall upon the inspection table 11 (Figure 1).

When one or more signal pulsations appear at the control grid of signal gate circuit tube 215 due to a properly labeled and positioned bottle 14 appearing in the position shown on the conveyor belt 12, these momentarily raise the grid potential of tube 215 above its critical value and cause this tube to conduct. Condenser 222 (Figure 10) is thus discharged through resistor 219 and tube 215 in series, and this causes the plate voltage of tube 215 and the control grid voltage of tube 182 to fall until the voltage is insufficient to maintain ionization in tube 215. The control grid of tube 182 at the same time falls below the cutoff value of that tube and the latter is rendered non-conducting. The cessation of plate current through relay 226 causes contact 227 and armature 228 to close, which in turn energizes pass solenoid 135 and withdraws spring-biased reject arm 130 to the position shown in Figure 11 so as to allow the properly labeled bottle 14 to continue its passage along the conveyor belt 12 rather than being rejected so as to fall upon the inspection table 11 (Figure 1).

Condenser 222 (Figure 10) starts its charging cycle immediately following the extinction of current flow in tube 215. Its rate of charge is adjusted by means of variable resistor 221, this being necessary to adjust the time during which the acceptance control circuit tube 182 is rendered non-conducting, the desired period of this non-conducting being dependent upon the speed of the conveyor belt and the spacing of the bottles carried thereby.

Should two correctly labeled bottles come very close together past the inspecting position on the conveyor belt, condenser 222 has not completed its charging cycle before tube 215 is fired again by the resultant positive signal pulsation applied to its control grid. This action maintains the negative bias on the control grid of acceptance control circuit tube 182 and re-cycling of the acceptance relay 226 is therefore not required. A variation of only 1.4 volts in critical control grid potential has been found between 50 volts and 300 volts of plate voltage with the screen grid of acceptance control circuit tube 182 connected in the manner shown, e. g., to the cathode thereof. Because of this fact, the frequency of inspection of labeled bottles, and the time constant involved, signal gate circuit tube 215 will fire at least once for every properly labeled bottle, despite the fact that condenser 222 may have completed only a portion of its charging cycle, and reject arm 130 will remain in its pass or non-reject position as long as the properly labeled bottles are sufficiently close together. In any event, reject arm 130 will move to its reject position, in the absence of the successive passage of properly labeled bottles past the inspection point on conveyor belt 12, at the predetermined time (fixed by the position of variable resistor 221) after the last positive signal pulsation due to a properly labeled bottle causes the signal gate circuit tube 215 to fire.

In Figures 18 through 26 are shown in block diagram form other circuits which may be utilized to control acceptance control circuit 182 in response to the signal pulsation output of photo-tube 43 in accordance with this invention. Each of these circuits preferably includes a cathode follower 150 coupling the output of photo-tube 43 to the successive circuitry in order to prevent this successive circuitry from loading the photo-tube and interfering with its operation, as described above. Each circuit also includes signal gate circuit 215 (or coincidence signal gate circuit 215') in order to maintain acceptance control circuit 182 and reject arm 130 (Figure 11) actuated for the proper predetermined interval of time even though but a single pulsation is produced from the photo-tube 43 due to a properly labeled and positioned bottle passing in front of the inspection assembly shown in Figure 11.

Figures 18, 19, 20, 21, 22, 23:
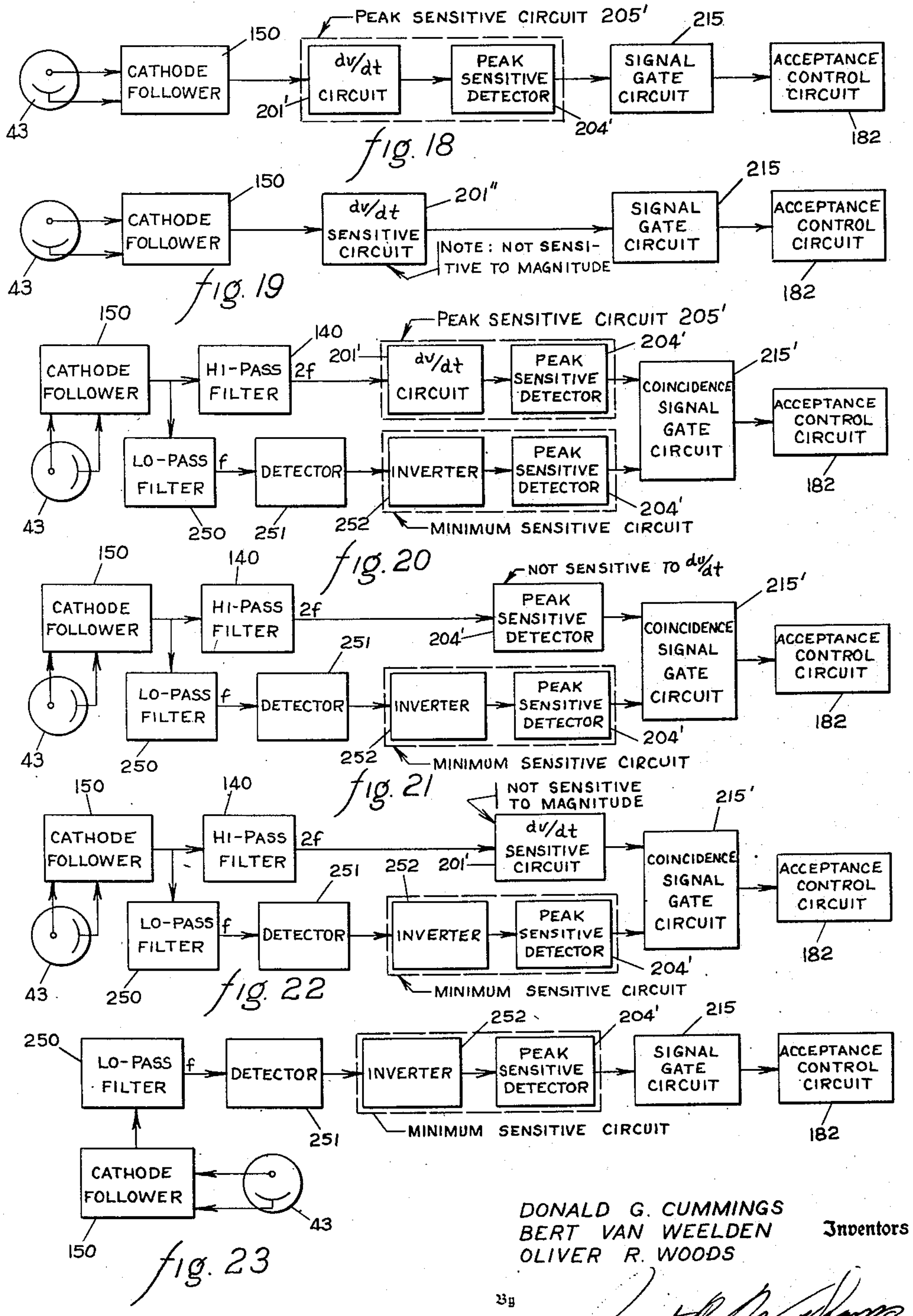

In the circuit of Figure 18 the fact that the rapid rate of change and the greatest magnitude of change in light intensity can occur only when there is registry between the optical image and a transparent facsimile on the scanning disk 55 is utilized. The output of its cathode follower 150 is coupled through differentiating circuit 201′ and a peak-sensitive detector 204′, the output of the latter being connected directly to the input of signal gate circuit 215. This circuit of Figure 18 relies for its operation upon the fact that when a properly labeled bottle passes in front of the apparatus, a signal pulsation such as that shown at D in Figure 14 is produced and the leading and trailing edges of this pulsation are much steeper than any other portion of the output voltage waveform X (Figure 14) from the photo-tube 43. Differentiating circuit 201′ produces an output whose magnitude is at any instant a measure of the slope of the output waveform X (Figure 14) of the photo-tube 43. By providing peak-sensitive detector 204′ with an adjustable bias the latter can be adjusted such that an output is produced therefrom only when any portion of waveform X has a slope at least equal to that of the leading or trailing edge of the dip portion D (Figure 14). This output of peak-sensitive detector 204′ thus actuates signal gate circuit 215 in the manner described above.

In the circuit of Figure 19 the output of the cathode follower 150 is coupled through a time rate of change of voltage or $dv/dt$ sensitive circuit 201″, the output of the latter being connected directly to the input of signal gate circuit 215. $dv/dt$ sensitive circuit 201″ is preferably of the type insensitive to the magnitude of its input and includes an adjustable element such that an output is produced from its circuit 201″ only if the time rate of change (or slope) of the input voltage exceeds a predetermined value. The circuit of Figure 19 is thus similar in its operation to the circuit of Figure 18, the difference being that the circuit of Figure 18 produces an input to signal gate circuit 215 thereof which is a measure of both the magnitude of the output of cathode follower 150 as well as the slope thereof, whereas the input to signal gate circuit 215 of Figure 19 is solely a measure of the slope of the output of cathode follower 150.

In Figure 20 is shown a circuit which takes advantage of the fact that the waveform X of Figure 14 is comprised substantially of a fundamental frequency plus a second harmonic component produced at registry. The fundamental frequency is determined by the speed of rotation of disk 55 and the number of transparent representations appearing thereon, as described above. The envelope of this fundamental frequency component decreases to a minimum value, substantially zero, at the instant of exact registry of the label, whereas the envelope of the second frequency component rises to a maximum at the same time and is at a minimum and substantially zero when registry does not occur. When partial registry occurs, the envelopes of both the fundamental frequency and the second harmonic thereof have values intermediate their maximum and minimum values. These fundamental and second harmonic frequency components of the output waveform X, taken from the output cathode follower 150, are separated into two separate channels by means of high-pass filter 140 and low-pass filter 250. The output of high-pass filter 140, which as described above became a maximum at registry, is fed through a peak-sensitive circuit 205′ to one input of coincidence signal gate circuit 215′. Peak-sensitive circuit 205′ includes a differentiating circuit 201′ and a peak-sensitive detector 204′. Differentiating circuit 201′ is included in order to produce at the input of peak-sensitive detector 204′ a voltage whose magnitude is a measure of the slope of the output of high-pass filter 140 as well as the absolute magnitude thereof. Peak-sensitive detector 204′ preferably has an adjustable grid bias and is adjusted such that an output is preferably produced from detector 204′ only when substantially 95% registry is obtained. The output of low-pass filter 250 is passed through detector 251 in order to obtain the envelope of the fundamental frequency component. This detected envelope is next inverted by means of inverter 252 and then fed to a second peak-sensitive detector 204′ whose output is connected to a second input of coincidence signal gate circuit 215′. Inverter 252 and peak-sensitive detector 204′ associated therewith constitute a minimum sensitive circuit, and the adjustable bias of this peak-sensitive detector 204′ it is also preferably adjusted such that an output will be produced therefrom only when substantially 95% registry is obtained. Coincidence signal gate circuit 215′ may be a screen grid tetrode gas-type switch tube, such as tube 215 or 182 of Figure 10, with one input connected to the control grid and the second input connected to the screen grid thereof. By proper biasing, the operation of this tube can be adjusted such that it is normally "off" or non-conducting and will conduct only if an input is received at both its inputs simultaneously. The circuit of Figure 20 thus insures that coincidence signal gate circuit 215′ will be actuated only when substantially 95% registry is obtained with the envelope of the primary frequency component of waveform X of Figure 14 having dropped to a minimum and the second harmonic component thereof having risen to a maximum. Note particularly that it is not necessary to detect the envelope of the second harmonic frequency component for use in the high frequency channel, and that, in fact, differentiating circuit 201′ is actuated by the slopes of the second harmonic waveform itself and not the slopes of the envelope thereof.

The circuits of Figures 21 and 22 are similar to the circuit of Figure 20 except that in Figure 21 differentiating circuit 201′ has been omitted from the high or second harmonic frequency channel whereas in Figure 22 peak-sensitive detector 204′ has been omitted from the same frequency channel. The circuit of Figure 21 thus operates solely upon the change in magnitude of the output filter 140, and similarly the circuit of Figure 22 operates solely upon the magnitude of the slope (or rate of change) of the output waveform from the filter 140.

Figure 24:
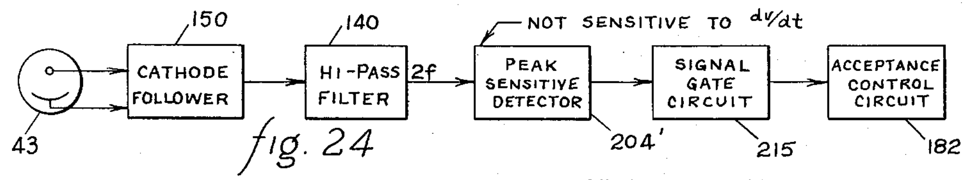
Figures 25, 26:
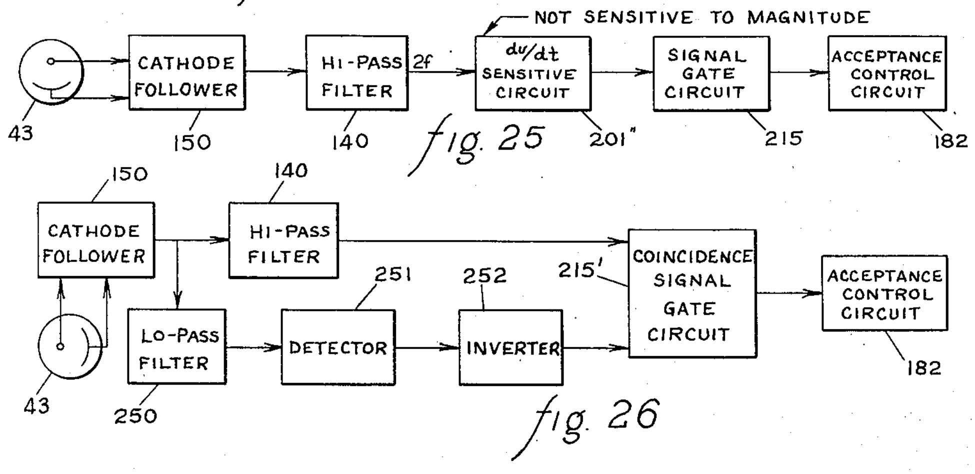

The circuit of Figure 23 is similar to the circuits of Figures 20 and 22, inclusive, in that it comprises merely the low or fundamental frequency channel thereof. The circuits of Figures 24 and 25 are similar to the circuits of Figures 21 and 22, respectively, in that each include merely the high or second harmonic frequency channel thereof, respectively. The operation of each of these circuits of Figures 23 to 25 is similar to the operation of the corresponding channel of Figures 20 to 22, as described above.

In Figure 26 is shown a circuit utilizing for its operation merely the changes of magnitude of the fundamental frequency and the second harmonic component thereof to minimum and maximum values, respectively, at registry. As in the circuit of Figure 20, the output of cathode follower 150 is separated into two separate channels by means of high-pass filter 140 and low-pass filter 250. The output of high-pass filter 140 is fed directly to a first input of coincidence signal gate circuit 215. The output of low-pass filter 250 is passed through detector 251 in order to obtain the envelope of the fundamental frequency component as in the circuit of Figure 20. This detected envelope, which falls to a minimum at registry, is next inverted by means of inverter 252 and then fed directly to the second input of coincidence signal gate circuit 215′. By proper biasing of the tube of circuit 215′, its operation can be adjusted such that it is normally "off" or non-conducting and will conduct only if inputs of predetermined values are received at both its inputs simultaneously. This biasing is preferably adjusted such that coincidence signal gate circuit 215′ will produce an output only when substantially 95% registry is obtained, with the envelope of the primary frequency component of waveform X of Figure 14 having dropped to a minimum and the second harmonic component thereof having risen to a miximum. Note again that, as in the case of the circuit of Figure 20, it is not necessary to detect the envelope of the second harmonic frequency component for use in the high frequency channel since the magnitudes of the individual positive peaks of the second harmonic wave simultaneously reach a maximum.

In addition to the foregoing preferred circuits, there are circuits which may be employed to advantage in certain inspection devices. These do not embody many of the detailed advantages of the circuit in the preferred form of the invention but may give satisfactory results in certain applications and are contemplated in the broader aspects of the invention.

*Summary*

We have herein disclosed a device meeting the objects and purposes above set forth ind have indicated a number of variations which will modify the structure and circuitry substantially but by which the basic ideas set forth may still be practiced. Accordingly, the claims hereinafter appended should be given a broad interpretation excepting where by their own express terms they are otherwise limited.

We claim:

1. In a process for identifying a predetermined pattern marking on an illuminated article and for performing an operation on said article, the steps: directing a beam of illumination reflected from the marked portion of said article upon a light responsive device; repeatedly, rapidly and regularly intercepting said beam of illumination with a facsimile of said marking and thereby creating a beam of regularly varying intensity, said varying being at one rate of change of intensity, the intensity of said beam falling upon said light responsive device being substantially altered when an intercepting facsimile registers with said marking in said beam, said altering occurring at a rate of change of intensity materially different from that of said regularly varying intensity, converting said illumination into a pulsating electrical current corresponding to said illumination and utilizing the different rates of change of intensity for selecting those pulsations arising from said registry; utilizing said pulsations to effect a performance of said operation.

2. In a process for identifying a predetermined shape characteristic on an illuminated article and for performing an operation as a result of such identifying, the steps: directing a beam of illumination reflected from said shape characteristic onto a light responsive device; repeatedly, rapidly and regularly moving a facsimile of said shape characteristic into and out of said beam of illumination, the intensity and rate of change of intensity of said beam falling upon said light responsive device being substantially altered when an intercepting facsimile registers with said shape characteristic in said beam; converting said illumination into a pulsating electrical current corresponding to said illumination and utilizing the differences in rate of change of intensity for selecting those pulsations arising from said registry; utilizing said pulsations to effect a performance of said operation.

3. In a process for identifying a predetermined shape characteristic on an illuminated article and for performing an operation as a result of such identifying, the steps: directing a beam of illumination bearing characteristics of said shape characteristic onto a light responsive device; repeatedly, rapidly and regularly moving a facsimile of said shape characteristic into and out of said beam of illumination, the intensity and rate of change of intensity of said beam falling upon said light responsive device being substantially altered when an intercepting facsimile registers with said shape characteristic in said beam; converting said illumination into a pulsating electrical current corresponding to said illumination and utilizing the differences in rate of change in intensity for selecting those pulsations arising from said registry; utilizing said pulsations to effect a performance of said operation.

4. In a process for identifying a shape characteristic on a moving illuminated article and for performing an operation as a result of such identifying, the steps: directing a beam of illumination reflected from said shape characteristic onto a light responsive device; passing a plurality of facsimiles of said shape characteristic through said beam in a plane spaced from said article and in a direction perpendicular to the direction of motion of said article, the intensity and rate of change of intensity of said beam falling upon said light responsive device being substantially altered when one of said facsimiles registers with said shape characteristic in said beam; converting said illumination into a pulsating electrical current corresponding to said illumination and utilizing the difference in the rates of change in intensities for selecting those pulsations arising from said registry; utilizing said selected pulsations to effect a performance of said operation.

5. In a method for identifying markings on articles under illumination and moving past a point, and for performing an operation with respect to those of said articles which are marked in a predetermined manner, the steps: converting light reflected from said articles into a beam of regularly varying intensity, said beam changing intensity at a first rate of change of intensity and materially and at a second rate of change of intensity changing the intensity of said beam when, and for the period of time that, a properly marked article is at said point; converting said light beam into an electrical potential of corresponding intensity and time characteristics; separating electric potential having said second rate of change of intensity; and utilizing electric potential having said second rate of change of intensity for performing said operation.

6. In a process for identifying a predetermined shape characteristic associated with an illuminated article and for performing an operation as a result of such identifying the steps: projecting as a beam a portion of the illumination emanating from said shape characteristic; repeatedly, rapidly and regularly intercepting said beam with a facsimile of said marking and thereby creating regular pulsations of light intensity, said pulsations each occurring at one predetermined rate of change of light intensity; and effecting also a signal pulsation at a second predetermined rate of change of light intensity occurring when an intercepting facsimile registers with the shape characteristic; utilizing the differences in respective rates of change of light intensity for separating said regular pulsations from said signal pulsations and utilizing the respective occurrence of regular pulsations and of signal pulsations for performing said operation.

7. In a process for inspecting markings on a plurality of illuminated articles moving past a point and for performing an operation with respect to those of said articles having a predetermined marking, the steps comprising: directing a beam of illumination reflected from that surface of each article bearing a marking, as said article is moved past said point, onto a light sensitive cell; causing a plurality of equally spaced, negative transparent facsimiles of said marking to pass successively through said beam, at least approximately half of one facsimile and not more than about one full facsimile lying within said beam at one time, thereby effecting a regular rate of change in illumination striking said cell, and an occasional irregular, faster rate of change in illumination, and of a predetermined magnitude, when a reflected image of a said marking and facsimile thereof coincide within said beam; converting said rates of change in illumination into corresponding pulsations in electrical current flow; selecting those electrical pulsations arising from said faster rate of change in illumination and which are of said predetermined magnitude and utilizing them to effect the performance of said operation.

8. In a device for identifying a shape characteristic, said shape characteristic being illuminated to provide a beam characterized by said shape characteristic, and for performing an operation as a result of such identifying, the combination comprising: a light responsive electric cell; an optical device directing a portion of said beam onto said cell and focused to place an image of said shape characteristic in a plane spaced from said cell; light control means for producing regular pulsations of light having one rate of change of light intensity comprising means for repeatedly, rapidly and regularly moving at least one facsimile of the shape characteristic into and out of said light beam, said facsimile being positionable by such moving into and out of coincidence with said image for producing a signal pulsation at another rate of change of light intensity; means for distinguishing between said rates of change of light intensity and for performing said operation as a result of said distinguishing.

9. In a device for identifying a shape characteristic, said shape characteristic being illuminated to provide a beam characterized by said shape characteristic, and for performing an operation as a result of such identifying, the combination comprising: a light responsive electric cell; an optical device directing a portion of said beam onto said cell and focused to place an image of said shape characteristic in a plane spaced from said cell; light control means for producing regular pulsations of light intensity comprising means for repeatedly, rapidly and regularly moving at least one facsimile of said shape characteristic into and out of said light beam, said facsimile being positionable by such moving for coincidence with said image; an electric circuit connected to said light responsive cell and responsive to the rate of change in the light-controlled characteristics of said light responsive cell which corresponds to the rate of change of light intensity falling onto said cell as a result of movement of a facsimile from one to another of two positions, one of which is a position of registry with an image in said plane and the other of which is a position of non-registry therewith.

10. In a device for identifying a shape characteristic, said shape characteristic being illuminated to provide a beam of light characterized by said shape characteristic, and for performing an operation as a result of such identifying, the combination comprising: a light responsive electric cell; an optical device directing a portion of said beam onto said cell and focused to place an image of said shape characteristic in a plane spaced from said cell; light control means for producing regular pulsations of light intensity comprising means for repeatedly, rapidly and regularly moving at least one facsimile of said shape characteristic into and out of said light beam, said facsimile being positionable for coincidence with said image; an electric circuit connected to said light responsive cell and responsive to the rate of change in the light controlled characteristics of said light responsive cell which corresponds to the rate of change of light intensity falling onto said cell as a result of movement of a facsimile from one to another of two positions, one of which is a position of registry with an image in said plane and the other of which is a position of nonregistry therewith, and said circuit being unresponsive to the rate of change in the light controlled characteristics of said light responsive cell which corresponds to the rate of change in light intensity falling onto the said cell as a result of said regular pulsations.

11. In a device for identifying a moving shape characteristic, said shape characteristic being illuminated to provide a beam of light directed substantially perpendicular to the direction of movement of said shape characteristic and said beam being modified in accordance with said shape characteristic, and said device performing an operation as a result of such identifying, the combination comprising: a light responsive electric cell; an optical device directing a portion of said modified beam onto said cell and focused to place an image of said shape characteristic in a plane spaced from said cell; light control means for producing regular pulsations of light intensity comprising means for repeatedly, rapidly and regularly moving at least one facsimile of said shape characteristic into and out of said light beam, said facsimile being positionable for coincidence with said image; an electric circuit connected to said light responsive cell and responsive to the rate of change in the light-controlled characteristics of said light responsive cell which corresponds to the rate of change of light intensity falling onto said cell as a result of movement of a facsimile from one to another of two positions, one of which is a position of registry with an image in said plane and the other of which is a position of non-registry therewith, and said circuit being unresponsive to the rate of change in the light controlled characteristics of said light responsive cell which corresponds to the rate of change in light intensity falling onto the said cell as a result of said regular pulsations.

12. In a device for identifying a moving shape characteristic and for performing an operation as a result of such identifying, the combination comprising: a light responsive electric cell; means directing a beam of light upon said shape characteristic for modifying said beam in accordance with said shape characteristic and for permitting it to travel away from said shape characteristic in a direction substantially perpendicular to the direction of movement of said shape characteristic; an optical device directing a portion of said modified beam onto said cell and focused to place an image of said surface characteristic in a plane located between said characteristic and said cell; light control means for producing regular pulsations of light intensity comprising means for repeatedly, rapidly and regularly intercepting said light beam in said plane with at least one facsimile of said characteristic, said facsimile being positionable for coincidence with said image in said plane; an electric circuit connected to said light responsive cell and responsive to a rate of change in the light-controlled characteristics of said light responsive cell substantially equal to the rate of change of light intensity falling onto said cell created by movement of a facsimile from one to another of two positions, one of which is a position of registry with an image in said plane and one of which is a position of non-registry therewith, and said circuit being unresponsive to the rate of change in the light controlled characteristics of said light responsive cell which corresponds to the rate of change in light intensity falling onto the said cell as a result of said regular pulsations.

13. In a device for identifying a shape characteristic and for performing an operation as a result of such identifying, the combination comprising: a light responsive electric cell; means directing a beam of light upon said shape characteristic and for modifying said beam according to said characteristic; an optical device directing a reflected portion of said modified beam onto said cell and focused to place an image of said surface characteristic in a plane between said shape characteristic and said cell; light control means for producing regular pulsations of light intensity comprising means for repeatedly, rapidly and regularly intercepting said light beam in said plane with a facsimile of said characteristic, said light control means including at least one facsimile identical in size with and positionable for coincidence with said image in said plane; an electric circuit connected to said light responsive cell and responsive to a rate of change in the light-controlled characteristics of said light responsive cell substantially equal to the rate of change of light intensity falling onto said cell created by movement of a facsimile from one to another of two positions, one of which is a position of registry with an image in said plane and one of which is a position of non-registry therewith, and said circuit being unresponsive to the rate of change in the light controlled characteristics of said light responsive cell which corresponds to the rate of change in light intensity falling onto the said cell as a result of said regular pulsations.

14. In a device for identifying a surface characteristic occurring on an article and having means for performing an operation as a result of such identifying, the combination comprising: a light responsive electric cell; means directing a beam of light upon said surface characteristic and for modifying said beam according to said surface characteristic; an optical device directing a portion of said modified beam onto said cell and focused to place an image of said surface characteristic in a plane between said article and said cell; light control means for producing regular pulsations of light intensity comprising means for repeatedly, rapidly and regularly intercepting said light beam in said plane with a facsimile of said characteristic, said light control means including at least one facsimile identical in size with and positionable for coincidence with said image in said plane; an electric circuit connected to said light responsive cell and responsive to a rate of change in the light-controlled characteristics of said light responsive cell substantially equal to the rate of change of said light-controlled characteristics of said cell created by movement of a facsimile from one to another of two positions, one of which is a position of registry with an image in said plane and one of which is a position of non-registry therewith, and said circuit being unresponsive to the rate of change in the light controlled characteristics of said light responsive cell which corresponds to the rate of change in light intensity falling onto the said cell as a result of said regular pulsations.

15. In an inspection device for identifying a shape characteristic associated with an illuminated article which article is moving linearly past a preselected point, and having means for performing an operation, the improvement comprising: an inspection head and a light responsive electric means therewithin, an optical device associated with said head for directing a beam of illumination reflected from said shape characteristic onto said light responsive electric means; means within said head having a plurality of light reflective facsimiles of said shape characteristic thereon reflecting said illumination onto said light responsive electric means and means causing said facsimiles to travel through said beam in a path substantially perpendicular to the direction of said linear motion and positioned to regularly interrupt said beam to produce a regular pulsation in light intensity and to effect a coincidence between one of said facsimiles and said marking for each transit of an article past said point and thereby produce a signal pulsation in light intensity and means including said light responsive means producing electrical pulsations corresponding to said pulsations in light intensity; an electric valve means unresponsive to electrical pulsations occurring at the rate of change in magnitude said regular pulsations in light intensity and responsive to electrical pulsations occurring at the rate of change in magnitude of the signal pulsations.

16. In an inspection device for identifying a shape characteristic associated with an illuminated article which article is moving linearly past a preselected point, and having means for performing an operation upon said article, the improvement comprising: an inspection head and a light responsive electric means therewithin; an optical device associated with said head for directing a beam of illumination reflected from said shape characteristic onto said light responsive electric means; means within said head including at least one facsimile of said shape characteristic and means causing said facsimile to vibrate in a plane perpendicular to the path of illumination reflected from said shape characteristic and in two directions which are substantially perpendicular to each other, said facsimile being positioned to regularly interrupt the path of said illumination between said optical device and said light responsive means to produce a regular pulsation in light intensity and to effect one coincidence between said facsimiles and said marking for each transit of an article past said point and thereby produce a signal pulsation in light intensity in said beam; means including said light responsive means producing electrical pulsations corresponding to said pulsations in light intensity; an electric valve means unresponsive to electrical pulsations occurring at the rate of change in magnitude of said regular pulsations in light intensity and responsive to electrical pulsations occurring at the rate of change in magnitude of the signal pulsations in light intensity which are of a predetermined minimum magnitude falling upon said light responsive means.

17. In an inspection device for identifying a marking on an illuminated article which article is moving linearly past a preselected point, and having means for performing an operation upon said article, the improvement comprising: an inspection head and a light responsive electric means therewithin; an optical device associated with said head for directing a beam of illumination reflected from said article onto said light responsive electric means; means within said head including an endless belt having a plurality of facsimiles of said marking thereon and means causing said facsimiles to travel through said beam in a path substantially perpendicular to the direction of said linear motion and positioned to regularly interrupt said beam to produce a regular pulsation in light intensity and to effect a coincidence between one of said facsimiles and said marking for each transit of an article past said point and thereby produce a signal pulsation in light intensity; means including said light responsive means producing electrical pulsations corresponding to said pulsations in light intensity; an electric valve means unresponsive to electrical pulsations occurring at the rate of change in magnitude of said regular pulsations in light intensity and responsive to electrical pulsations occurring at the rate of change in magnitude of the signal pulsations in light intensity which are of a predetermined minimum magnitude falling upon said light responsive means.

18. In a device for inspecting markings on a plurality of illuminated articles moving past a point and for performing an operation with respect to those of said articles having a predetermined marking, the combination comprising: a light sensitive cell; means directing a beam of illumination reflected from that surface of each article bearing one of said markings, as said article is moved past said point, onto said light sensitive cell; means causing a plurality of equally spaced, negative transparent facsimiles of said marking to pass successively through said beam, said means permitting at least approximately half of one facsimile and not more than about one full facsimile to lie within said beam at one time, thereby effecting a regular rate of change in illumination striking said cell, and an occasional irregular, faster rate of change in illumination, and of a predetermined magnitude, when a reflected image of said marking and facsimile thereof coincide within said beam; means converting said rates of change in illumination into corresponding pulsations in electrical current flow; filter means selecting those electrical pulsations arising from said faster rate of change in illumination and which are of said predetermined magnitude and utilizing them to effect the performance of said operation.

19. In an inspection device for identifying a marking on an illuminated article which article is moving linearly past a preselected point, and having means for performing an operation upon said article, the improvement comprising: an inspection head and a light responsive electric means therewithin; an optical device associated with said head for directing illumination reflected from said article onto said light responsive electrical means; means within said head having a plurality of facsimiles of said marking thereon and means causing said facsimiles to travel in a path substantially perpendicular to the direction of said linear motion and regularly interrupting the path of said illumination between said optical device and said light responsive means; means including said light responsive means producing electrical pulsations corresponding to said pulsations in light intensity; an electric valve means unresponsive to said regular pulsations in intensity and responsive to faster, irregular pulsations in light intensity which are of a predetermined magnitude falling upon said light responsive means, said last-named pulsations being effected by registry of a marking and a facsimile in said illumination path.

20. In an apparatus for inspecting a surface characteristic on an article moving with respect to said apparatus for conformity with a selected true characteristic, said surface characteristic intercepting a light beam, the combination of a plurality of transparent facsimiles of said true characteristic and means causing said facsimiles to pass through said beam at a constant frequency and in such position that one of them will momentarily be positioned substantially in registry with said surface characteristic in one position of said moving article if said surface characteristic is identical with said true characteristic; a photo-electric cell in position to be energized by said beam of light passing through said facsimiles; electrical means connected therewith, and unresponsive to normal pulsations occurring at one rate of change of magnitude and responsive to signal pulsations in said light intensity occurring at a different rate of change of magnitude; and means actuated by said electrical means upon the occurrence of a signal pulsation.

21. In an inspection device for identifying a surface characteristic occurring on an illuminated moving article and having means for performing an operation on said article, the combination of a light-responsive cell, means for illuminating said light-responsive cell by means of a beam of light and for creating regular pulsations in light intensity thereon comprising a means carrying a plurality of evenly spaced negative facsimiles and causing same to pass through said beam of light at a constant speed in a direction substantially perpendicular to the axis of said beam and at an angle to the direction of movement of said moving article; an optical device for directing illumination reflected from said surface characteristic in the locus of the facsimiles; a time rate of change of voltage sensitive circuit connected to the output of said light-responsive cell; and a signal gate circuit connected to and responsive to the output of said time rate of change of voltage sensitive circuit and connected to control the means for performing an operation upon the article.

22. An inspection device, for identifying a marking on an illuminated article comprising in combination: a light responsive means within said inspection device and an optical device directing reflected illumination from said article upon said light responsive means; a sheet having a facsimile of said marking thereon and means causing said facsimile to interrupt the path of said illumination between said light responsive means and said optical device; means for performing an operation upon said article, and electrical means, responsive to a rapid rate of change and unresponsive to slower rates of change in the illumination of said light responsive means, for converting said rapid rate of change in illumination into performance of said operation.

23. In an inspection device for identifying a marking on an illuminated article, and having means for performing an operation upon said article, the improvement comprising: an inspection head and a light responsive device therewithin; an optical device associated with said head for directing illumination reflected from said article onto said light responsive device; a sheet being substantially opaque except for at least one negative facsimile of said marking thereon and means causing said facsimile to interrupt the path of said illumination between said optical device and said light responsive device; a pair of light interceptors having opposed spaced edges controlling said illumination path between said optical device and said sheet, so that at least part of said facsimile is always within said illumination path; and electrical means responsive to rapid rates of change, where same are of a predetermined magnitude, and unresponsive to slower rates of change in the illumination falling upon said light responsive device, said rapid rate of change, if of said predetermined magnitude, effecting performance of said operation.

24. In an inspection device for identifying a marking on an illuminated article, and having means for performing an operation upon said article, the improvement comprising: an inspection head and a light responsive means therewithin; an optical device associated with said head for directing illumination reflected from said article onto said light responsive means; a disk within said head, said disk being opaque except for a plurality of negative facsimiles of said marking thereon, and means causing said facsimiles to interrupt the path of said illumination between said optical device and said light responsive means, thereby causing a regular pulsation in light intensity upon said light responsive means; a pair of light interceptors having opposed, spaced edges controlling said illumination path between said optical device and said disk, so that at least part of one facsimile is always within said illumination path; an electrical valve means unresponsive to said regular pulsations in intensity and responsive to faster, irregular pulsations in said light intensity falling upon said light responsive means due to coincidence between a marking and a facsimile in said illumination path; means responsive to said valve means for effecting performance of said operation.

25. In an inspection device for identifying a marking on an illuminated article moving past said device, and having means for performing an operation upon said article, the improvement comprising: an inspection head having a front plate spaced from the path of said articles and an opening in said plate; a light responsive means within said head, and an optical device associated with said head and directing the illumination reflected from said article through said opening onto said light responsive means; a disk rotatably and removably supported with its radially outer portion extending into the path of said illumination between said optical device and said cell, said disk having a plurality of facsimiles of said marking equally spaced thereabout; means causing said facsimiles to pass through said illumination path; a pair of vertical, adjustable, coplanar, light interceptors having opposed edges restricting the said illumination path between said optical device and said disk so that at least a part of one facsimile is within said illumination path at all times; and electrical means responsive to a rapid rate of change where same is of a predetermined magnitude, and unresponsive to slower rates of change in the illumination falling upon said light responsive means, said rapid rate of change, if of a predetermined magnitude, effecting the performance of said operation.

26. In an inspection device for identifying an elongated marking on an illuminated article moving past said device, and having means for performing an operation upon said article, the improvement comprising: an inspection head having a front plate spaced from the path of said article and an opening in said plate; a light responsive device within said head and an optical device positioned upon said front plate to direct the illumination reflected from said article through said opening and onto said light responsive device; a disk rotatably and removably supported so that its radially outer portion extends into the path of said illumination between said optical device and said light responsive device, said outer portion being opaque except for at least one radially disposed, transparent, negative facsimile of said elongated marking thereon permitting said illumination to pass therethrough; means causing said facsimile to pass through said illumination path; a pair of vertical, coplanar light interceptors having vertically adjustable and opposed edges restricting the said illumination path between said optical device and said disk, said edges being spaced apart so that said image may be completely contained within said illumination path, and each edge being inclined toward the other at an angle from zero to 3½ degrees to a radius of the disk cutting the midpoint of each respective edge; and electrical means responsive to a rapid rate of change and unresponsive to slower rates of change in the illumination falling upon said light responsive device, said rapid rate of change effecting performance of said operation.

27. In an inspection device for identifying a horizontally elongated marking on a plurality of illuminated articles moving past said device, and having electro-responsive means for performing an operation with respect to those of said articles having a correct marking, the improvement comprising: an enclosed inspection head having parallel, spaced front and back plates, said front plate being spaced from and parallel with the path of said moving articles and having an opening therethrough; a photoelectric device within said inspection head and aligned with said opening, and an adjustable optical device removably secured to said front plate and positioned to direct the illumination reflected from said articles through said opening and onto said photoelectric device; a circular, photographic transparency rotatably and removably supported with its radially outer portion extending into the path of said illumination between said optical device and said photoelectric device, said outer portion having a plurality of radially disposed facsimiles of said elongated marking equally spaced from each other and the center of said transparency; means rotating said transparency and causing said facsimiles to pass through said illumination path; a pair of light interceptors lying within the same vertical plane and pivotally supported adjacent to said transparency for vertical adjustment toward and away from each other in the path of said illumination between said optical device and said transparency, said interceptors having vertically opposed edges spaced from each other so that at least part of one facsimile and not more than parts of two facsimiles are passing through said illumination path at one time, the upper of said edges being disposed at an angle of approximately 2 degrees to a radius of the transparency passing through the midpoint of said upper edge and the lower edge being disposed at an angle of approximately 3 degrees to a radius of the transparency passing through the midpoint of said lower edge; and electrical means, responsive to a rapid rate of change and unresponsive to slower rates of change in the amount of illumination reaching said photoelectric device, electrically connecting said photoelectric device to said electro-responsive means.

28. In an inspection device for identifying a predetermined marking on an illuminated article and effecting an operation upon said article, the improvement comprising: an inspection head and a light responsive device within said head; an optical device associated with said head for directing the reflected illumination from said article upon said light responsive device; a pair of coaxial, separable flanges rotatably supported within said head; a sheet removably held between said flanges and rotatable therewith, said sheet having a negative facsimile of said marking thereon; means rotating said flanges and thereby causing said facsimile to pass through the path of said illumination between said optical device and said light responsive device; means providing an aperture having a pair of opposed edges inclined to each other which controllably restrict said illumination path between said optical device and said disk; and electrical means, responsive only to a rapid rate of change in the illumination striking said cell, for effecting said operation.

29. In an inspection device for identifying a predetermined marking on an illumination article, said device having means for performing an operation with respect to said article, the improvement comprising: an enclosed inspection head spaced from said article and having an opening through the adjacent side thereof; a light responsive device within said head and an optical device secured to said head for directing the illumination reflected from said article through said opening and onto said light responsive device; a pair of coaxial, separable flanges rotatably supported within said head adjacent to said optical device; a sheet gripped between said flanges and rotatable therewith, said sheet being opaque except for at least one negative facsimile of said marking thereon; means rotating said flanges and causing said facsimile to pass through the path of said illumination between said cell and said optical device; means providing an aperture between said sheet and said optical device, said aperture having a pair of opposed edges inclined toward each other between which said illumination passes; electrical means, responsive to a rapid rate of change and unresponsive to slower rates of change in the amount of illumination striking said cell, for translating said rapid rate of change of illumination into a performance of said operation upon said article.

30. In an inspection device for identifying a predetermined marking on an illuminated article moving past said device and having electro-responsive means for performing an operation affecting said article, the improvement comprising: an enclosed inspection head having a front plate spaced from the path of said moving article, said front plate having an opening therethrough; a light responsive device within said head and aligned with said opening, and an optical device secured to said front plate and positioned to direct the illumination reflected from said article through said opening and onto said light responsive device; a first flange rotatably supported upon said front plate within said head adjacent to said optical device, and a second flange rotatably supported adjacent to and coaxial with said first flange; resilient means urging said flanges together and means effecting their simultaneous rotation; an opaque disk removably supported between said flanges and rotatable therewith, the radially outer portion of said disk interrupting the path of said illumination between said light responsive device and said optical device, said outer portion having a transparent negative facsimile of said marking thereon permitting passage of said illumination therethrough; a pair of light interceptors having vertically opposed, spaced edges inclined to each other and controlling the said illumination path between said disk and said optical device; and electrical means electrically connecting said light responsive device to said electro-responsive means, said electrical means being operatively responsive to a rapid rate of change and unresponsive to slower rates of change in the amount of illumination reaching said cell.

31. In an inspection device for identifying markings on a plurality of illuminated articles being moved past said device and having electro-responsive means for effecting a deviation in the movement of those of said articles marked in a predetermined manner, the improvement comprising: an enclosed inspection head having a front plate and a back plate spaced from and substantially parallel with the path of said moving articles, said front plate having a circular light opening therethrough; a photoelectric device positioned within said inspection head along the axis of said light opening; an optical device removably secured to said front plate within said light opening, said optical device being positioned to direct the path of the reflected illumination from said articles onto said photoelectric device; a circular pressure flange rotatably and axially reciprocably supported upon said front plate within said head adjacent to said optical device; a circular support flange rotatably supported within said head upon said back plate, said support flange being engageable by and coaxial with said pressure flange; resilient means yieldably urging said pressure flange toward said support flange and handle means secured to said pressure flange for movement thereof axially away from said support flange; means effecting simultaneous rotation of said support and pressure flanges; a circular transparency removably supported between said support and pressure flanges for rotation therewith and pilot means holding said transparency coaxial with said flanges, the outer portion of said transparency extending to a point between said photoelectric device and said optical device thereby interrupting said illumination path, and being opaque except for a plurality of negative facsimiles of said marking equally spaced, both radially and circumferentially, therearound, said facsimiles permitting the passage of said illumination through said transparency; a pair of vertically disposed, substantially coplanar light interceptors pivotally supported coaxially with said pressure flange for adjustment toward and away from each other between said transparency and said optical device, said interceptors having vertically opposed edges inclined to each other, said edges being spaced to permit a predeterminable portion of said illumination to pass therebetween; and electrical means electrically connecting said photoelectric device to said electro-responsive means, said electrical means being operatively responsive to a rapid rate of change and unresponsive to slower rates of changes on the amount of illumination reaching said photoelectric device.

32. An inspection device for identifying a marking on an article being moved on a conveyor past said device and spaced therefrom, and for energizing electro-responsive means for performing one operation on said article if same is marked in a predetermined manner and for performing another operation on said article if same is not marked in said predetermined manner, comprising in combination: an inspection head having a front plate substantially parallel with said conveyor, said plate having an opening therethrough; an optical device associated with said opening and focusable upon said marking; a light responsive device positioned within said inspection head to intercept all of the light passing through said optical device; a disk rotatably supported between said light responsive device and said optical device for interrupting the path of said light, said disk being opaque except for at least one negative facsimile of said marking within that portion thereof interrupting said light path; means providing an adjustable aperture between said disk and said optical device, said aperture having vertically opposed edges inclined to each other and restricting said light path; and electrical means responsive to a rapid rate of change for energizing said electro-responsive means and unresponsive to slower rates of change in the current output of said light responsive device, said rapid rate of change resulting from the registry within said light path of said marking and said facsimile.

33. In an inspection device for identifying and mechanically reacting to a marking on an illuminated article moving past a point spaced from said device, comprising in combination: an inspection head having front and back plates, said front plate having an opening therethrough; an optical device removably secured to said front plate and associated with said opening, said optical device having a light path therethrough intersecting said point and passing through said opening; a light responsive electrical device positioned across all of said light path between said front and back plates; a generally opaque disk rotatably supported between said light responsive electrical device and said front plate interrupting said light path, said disk having a plurality of negative, transparent facsimiles of said marking peripherally arranged thereabout and permitting passage of said light path therethrough; a pair of light interceptors positioned between said disk and said front plate, said interceptors having vertically opposed, spaced edges inclined with respect to each other and controlling the shape of the light beam passing therebetween; and electrical means electrically connected to said light responsive electrical device for effecting said mechanical reacting, said electrical means being responsive to a relatively rapid rate of change and unresponsive to a relatively slower rate of change in the amount of light striking said light responsive electrical device.

34. An inspection device for identifying a predetermined marking on a plurality of illuminated articles moving past a point spaced from said device and having electro-responsive gate means for passing only those articles having accurate and properly positioned markings, comprising in combination: an inspection head frame having parallel, front and back plates, said front plate having a circular opening therethrough; a cylindrical, adjustable optical device coaxial with said circular opening and removably secured to said front plate, said optical device having a light path therethrough and being focused upon said point; a photoelectric tube interposed between said front and back plates and positioned across all of said light path; a circular transparency rotatably supported between said tube and said front plate for interrupting said light path, and a plurality of negative facsimiles of said marking equally spaced around the radially outer portion of said transparency said facsimiles permitting passage of said light path through said transparency, and the remainder of said transparency being substantially opaque; a pair of vertically disposed, substantially coplanar light interceptors located between said front plate and said transparency, said interceptors being adjacent to said transparency and having vertically opposed edges inclined with respect to each other, said edges being spaced to permit a predeterminable portion of the light beam following said light path to pass therebetween; and electrical means including a high-pass filter electrically connecting said photoelectric tube to said electro-responsive gate means, said electrical means being responsive to rapid rates of change in the excitation of said photo-tube and unresponsive to slower rates of change in the excitation of said photo-tube.

35. In an apparatus for inspecting a surface characteristic on an article moving with respect to said apparatus for conformity with a selected true characteristic, said surface characteristic intercepting a light beam, the combination of a plurality of facsimiles of said true characteristic and means causing said facsimiles to pass through said beam at a constant frequency and in such position that one of them will momentarily be positioned substantially in registry with said surface characteristic in one position of said moving article if said surface characteristic is identical with said true characteristic; a photo-electric cell; an optical system directing said beam through the path of said facsimiles onto said photo-electric cell and focused to place an image of said surface characteristic coincident with a facsimile in one position thereof in said path; a filter in circuit with said photo-electric cell having the property of blocking from the output thereof pulsations of fundamental frequency equal to said constant frequency and having the property of passing pulsations of other frequencies created by the coincidence of said image with a facsimile substantially in said one position; a differentiating circuit connected to said filter and responsive to an output thereof caused by a rate of change in the output of said photo-electric cell substantially equal to that created by movement of a facsimile between a position of coincidence with said image in said beam and a position of non-coincidence therewith; and a peak-sensitive detector in circuit with said differentiating circuit and biased to pass only pulsations in the output of said photo-electric cell of substantially the magnitude created by the movement of a facsimile between said positions of coincidence and non-coincidence with said image in said beam.

36. In an apparatus for inspecting a surface characteristic on an article moving with respect to said apparatus for conformity with a selected true characteristic, said surface characteristic intercepting a light beam, the combination of a plurality of facsimiles of said true characteristic and means causing said facsimiles to pass in the path of said beam at a constant frequency and in such position that one of them will momentarily be positioned substantially in registry with said surface characteristic in one position of said moving article if said surface characteristic is identical with said true characteristic; a photo-electric cell; an optical system directing said beam through the path of said facsimiles onto said photo-electric cell and focused to place an image of said surface characteristic coincident with a facsimile in one position thereof in said path; a differentiating circuit connected to said photo-electric cell and responsive to a rate of change in the output of said photo-electric cell substantially equal to that created by movement of a facsimile between said position of coincidence with said image in said beam and a position of non-coincidence therewith; and a peak-sensitive detector in circuit with said differentiating circuit and biased to pass only pulsations in the output of said photo-electric cell of substantially the magnitude created by the movement of a facsimile between said positions of coincidence and non-coincidence with said image in said beam.

37. In an apparatus for inspecting a surface characteristic on an article moving with respect to said apparatus for conformity with a selected true characteristic, said surface characteristic intercepting a light beam, the combination of a plurality of facsimiles of said true characteristic and means causing said facsimiles to pass through said beam at a constant frequency and in such position that one of them will momentarily be positioned substantially in registry with said surface characteristic in one position of said moving article if said surface characteristic is identical with said true characteristic; a photo-electric cell; an optical system directing said beam in the path of said facsimiles and onto said photo-electric cell and focused to place an image of said surface characteristic coincident with a facsimile in one position thereof in said path; a filter in circuit with said photo-electric cell and having the property of blocking from the output thereof pulsations of the fundamental frequency equal to said constant frequency and having the property of passing pulsations of frequencies created by the coincidence of said image with a facsimile substantially in said position; a time rate of change of voltage sensitive circuit connected to said filter and responsive to an output thereof caused by a rate of change in the output of said photo-electric cell substantially equal to that created by movement of a facsimile between a position of coincidence with said image in said beam and a position of non-coincidence therewith.

38. In an apparatus for inspecting a surface characteristic on an article moving with respect to said apparatus for conformity with a selected true characteristic, said surface characteristic intercepting a light beam, the combination of a plurality of facsimiles of said true characteristic and means causing said facsimiles to pass through said beam at a constant frequency and in such position that one of them will momentarily be positioned substantially in registry with said surface characteristic in one position of said moving article if said surface characteristic is identical with said true characteristic; a photo-electric cell in position to be energized by said beam of light passing through said optical system and said facsimiles, a differentiating circuit connected to said photo-electric cell and responsive to a rate of change in the output of said photo-electric cell substantially equal to that created by movement of a facsimile between a position of registry wtih an image in said optical system of a characteristic to be inspected and a position of non-registry therewith.

39. In an apparatus for inspecting a surface characteristic on an article moving with respect to said apparatus for conformity with a selected true characteristic, said surface characteristic intercepting a light beam, the combination of a plurality of facsimiles of said true characteristic and means causing said facsimiles to pass in the path of said beam at a constant frequency and in such position that one of them will momentarily be positioned substantially in registry with said surface characteristic in one position of said moving article if said surface characteristic is identical with said true characteristic; a photo-electric cell; an optical system directing said beam through the path of said facsimiles and onto said photo-electric cell and focused to place an image of said surface characteristic coincident with a facsimile in one position thereof in said path; a filter in circuit with said photo-electric cell and having the property of blocking from the output of said photo-electric cell pulsations of fundamental frequency equal to said constant frequency and having the property of passing other frequencies created by the coincidence of said image with a facsimile substantially in said one position; and a peak-sensitive detector in circuit with said photo-electric cell and biased to pass only pulsations in the output of said photo-electric cell of substantially the magnitude created by the movement of a facsimile between said position of coincidence with said image in said beam and a position of non-coincidence therewith.

40. In an inspection device for identifying a surface characteristic occurring on an article and having means for performing an operation on said article, the combination comprising: a light responsive cell; means directing a beam of light upon said surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said light beam while in said plane with a facsimile of said characteristic, said light control means including at least one facsimile identical in size with and positionable for coincidence with said image in said plane; a filter in circuit with said light-responsive cell adapted to block from the output thereof the frequency produced by said regular pulsations; a differentiating circuit connected to the output of said filter; a peak-sensitive detector connected to the output of said differentiating circuit; a signal gate circuit connected to and responsive to the output of said peak-sensitive detector and connected to control means for performing an operation upon the article.

41. In an inspection device for identifying a surface characteristic occurring on an article and having means for performing an operation on said article, the combination comprising: a light-responsive cell; means directing a beam of light upon said surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristics, said light control means including at least one facsimile identical in size with and positionable for coincidence with said image in said plane; a filter in circuit with said light-responsive cell adapted to block from the output thereof the frequency produced by said regular pulsations; a time rate of change of voltage sensitive circuit connected to the output of said filter, a signal gate circuit connected to and responsive to the output of said time rate of change circuit and connected to control means for performing an operation upon the article.

42. In an inspection device for identifying a surface characteristic occurring on an illuminated article and having means for performing an operation on said article, the combination of a light-responsive cell, means for illuminating said light-responsive cell by means of a beam of light and for creating regular pulsations in light intensity thereon comprising a disk opaque except for a plurality of negative images of said surface characteristic, and means for rotating said disk, said disk being disposed to cause said images to pass through said beam of light when the disk is rotated, an optical device for directing illumination reflected from the article to be inspected and for focusing an image of the surface characteristic to be identified in the locus of the negative images of said disk, a differentiating circuit connected to the output of said light-responsive cell; a peak-sensitive detector connected to the output of said differentiating circuit; and a signal gate circuit connected to and responsive to the output of said peak-sensitive detector and connected to control the means for performing an operation upon the article.

43. In an inspection device for identifying a surface characteristic occurring on an illuminated article and having means for performing an operation on said article, the combination of a light-responsive cell, means for illuminating said light-responsive cell by means of a beam of light and for creating regular pulsations in light intensity thereon comprising a means carrying a plurality of evenly spaced negative facsimiles of said surface characteristic, and means for causing said facsimiles to pass through said beam of light at a constant speed; an optical device for directing illumination reflected from said surface characteristic in the locus of the facsimiles; a time rate of change of voltage sensitive circuit connected to the output of said light-responsive cell; and a signal gate circuit connected to and responsive to the output of said time rate of change of voltage sensitive circuit and connected to control the means for performing an operation upon the article.

44. In an inspection device for identifying a surface characteristic occurring on an article and having means for performing an operation on said article, the combination comprising: a light-responsive cell; means directing a beam of light upon said surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristic, said light control means including at least one facsimile identical in size with and positionable for coincidence with said image in said plane; a filter in circuit with said light-responsive cell adapted to block from the output thereof the frequency produced by said regular pulsations; a peak-sensitive detector connected to the output of said filter; and a signal gate circuit connected to and responsive to the output of said peak-sensitive detector and connected to control the means for performing an operation upon the article.

45. In an apparatus of the class described, the combination comprising: a light responsive cell; means directing a beam of light upon a surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristic, said light control means including at least one facsimile identical in size with and positionable for coincidence with said image in said plane; a high-pass filter in circuit with said cell and having the property of blocking from the output of said cell the pulsations of the fundamental frequency produced by said regular pulsations and having the property of passing the pulsations of other frequencies created by the substantial coincidence of said image and a said facsimile in said plane; a differentiating circuit connected to said filter and responsive to an output thereof caused by a rate of change in the output of said cell substantially equal to that created by movement of a facsimile between a position of coincidence with said image in said plane and position of non-coincidence therewith; a first peak-sensitive detector in circuit with said differentiating circuit and biased to pass only pulsations in the output of said cell of substantially the magnitude created by the movement of a facsimile between positions of coincidence and non-coincidence with said image in said plane; a low-pass filter in circuit with said cell and having the property of blocking from the output of said cell pulsations of said other frequencies and having the property of passing pulsations of said fundamental frequency; a detector connected to the output of said low-pass filter for detecting the envelope of the fundamental frequency output thereof; an inverter and a second peak-sensitive detector connected through said inverter to said envelope detector and biased to pass only detected inverted outputs of said low-pass filter of substantially the magnitude created by the movement of a facsimile between said positions of coincidence and non-coincidence with an image in said plane; and a coincidence signal gate circuit having two inputs connected respectively to the outputs of said first and second peak-sensitive detectors.

46. In an apparatus of the class described the combination comprising: a light responsive cell; means directing a beam of light upon a surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristic, said light control means including at least one facsimile identical in size with and positionable for coincidence with said image in said plane; a high-pass filter in circuit with said cell and having the property of blocking from the output of said cell pulsations of the fundamental frequency produced by said regular pulsations and having the property of passing pulsations of other frequencies created by the substantial coincidence of said image and a said facsimile in said plane; a first peak sensitive detector in circuit with said cell and biased to pass only pulsations in the output thereof of substantially the magnitude created by the movement of a facsimile between a position of coincidence with said image in said plane and a position of non-coincidence therewith; a low-pass filter in circuit with said cell and adapted to block from the output thereof pulsations of said other frequencies and having the property of passing pulsations of said fundamental frequency; a detector connected to the output of said low-pass filter for detecting the envelope of the fundamental frequency output thereof; an inverter and a second peak-sensitive detector connected through said inverter to said envelope detector and biased to pass only detected inverted outputs of said low-pass filter of substantially the magnitude created by the movement of a facsimile between said positions of coincidence and non-coincidence with an image in said plane; and a coincidence signal gate circuit having two inputs connected respectively to the outputs of said first and second peak-sensitive detectors.

47. In an apparatus of the class described the combination comprising: a light responsive cell; means directing a beam of light upon a surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristic, said light control means including at least one facsimile identical in size with and positionable for coincidence with said image in said plane; a high-pass filter in circuit with said cell and having the property of blocking from the output of said cell pulsations of the fundamental frequency produced by said regular pulsations and having the property of passing pulsations of other frequencies created by the substantial coincidence of said image and a said facsimile in said plane; a time rate of change of voltage sensitive circuit connected to said filter and responsive to an output thereof caused by a rate of change in the output of said cell substantially equal to that created by movement of a facsimile between a position of coincidence with said image in said plane and a position of non-coincidence therewith; a low-pass filter in circuit with said cell and having the property of blocking from the output of said cell pulsations of said other frequencies and having the property of passing pulsations of said fundamental frequency; a detector connected to the output of said low-pass filter for detecting the envelope of the fundamental frequency output thereof; an inverter and a peak-sensitive detector connected through said inverter to said envelope detector and biased to pass only detected inverted outputs of said low-pass filter of substantially the magnitude created by the movement of a facsimile between said positions of coincidence and non-coincidence with an image in said plane; and a coincidence signal gate circuit having two inputs connected respectively to the outputs of said time rate of change of voltage sensitive circuit and said peak-sensitive detector.

48. In an apparatus of the class described the combination comprising: a light responsive cell; means directing a beam of light upon a surface characteristic; an optical device directing a reflected portion of said beam onto said cell and focused to place an image of said surface characteristic in a plane spaced from said cell; light control means for producing regular pulsations of light intensity comprising means for repeatedly, rapidly and regularly intercepting said beam while in said plane with a facsimile of said characteristic, said light control means including at least one facsimile identical in size with and positionable for coincidence with said image in said plane; a low-pass filter in circuit with said cell and having the property of passing pulsations of the fundamental frequency produced by said regular pulsations; a detector connected to the output of said low-pass filter for detecting the envelope of the fundamental frequency output thereof; an inverter and a peak-sensitive detector connected through said inverter to said envelope detector and biased to pass only detected inverted outputs of said low-pass filter of substantially the magnitude created by the movement of a facsimile between a position of coincidence with an image in said plane and a position of non-coincidence therewith.

49. In an apparatus of the class described the combination comprising: a light responsive cell; means directing a beam of light upon a surface characteristic; an optical device directing a reflected portion of said beam onto said cell and focused to place an image of said surface characteristic in a plane spaced from said cell; a facsimile of said characteristic and means causing said facsimile to pass repeatedly and rapidly through said reflected beam while in said plane thereby producing regular pulsations in light intensity on said cell; said facsimile being identical in size with, and positionable by said last-mentioned means for coincidence with, said image in said plane; a high-pass filter in circuit with said cell and having the property of blocking from the output of said cell pulsations of the fundamental frequency produced by said regular pulsations and having the property of passing pulsations of other frequencies created by the substantial coincidence of said image and one of said facsimiles in said plane; a low-pass filter in circuit with said cell and having the property of blocking from the output of said cell pulsations of said other frequencies and having the property of passing pulsations of said fundamental frequency; a detector connected to the output of said low-pass filter for detecting the envelope of the fundamental frequency output thereof; an inverter connected to the output of said detector; and a coincidence signal gate circuit having two inputs connected respectively to the outputs of said high-pass filter and said inverter and biased to produce an output only in response to inputs of substantially the magnitude created by the movement of a facsimile between a position of coincidence with said image in said plane and a position of non-coincidence therewith.

50. In an apparatus of the class described, the combination of a rotatable opaque disk having a plurality of annularly disposed, evenly spaced transparent negative facsimiles of a surface characteristic to be inspected, means for rotating said disk at a constant speed, an optical system arranged to send a beam of light to be intercepted by said negative facsimiles successively as said disk is rotated at a constant frequency and focused to throw an image of the characteristic to be inspected in the locus of said negative facsimiles in said beam, a photo-electric cell in position to be energized by said beam of light passing through said optical system and said negative facsimiles, a filter in circuit with said photo-electric cell and adapted to block from the output thereof pulsations of the fundamental frequency equal to said constant frequency and having the property of passing other frequencies created by the coincidence of said image with a substantially complete facsimile within said beam; and a peak-sensitive detector in circuit with said photo-electric cell and biased to pass only pulsations in the output of said photo-electric cell of substantially the magnitude created by the movement of a facsimile between said position of coincidence with said image in said beam and a position of non-coincidence therewith.

51. In an apparatus of the class described, the combination of a rotatable opaque disk having a plurality of annularly disposed, evenly spaced, transparent facsimiles of a surface characteristic to be inspected, means for rotating said disk at a constant speed, an optical system arranged to direct a beam of light to be intercepted by said facsimiles successively as said disk is rotated and focused to throw an image of the characteristic to be inspected in the locus of said facsimiles in said beam, a photo-electric cell in position to be energized by said beam of light passing through said optical system and said facsimiles, a differentiating circuit connected to said photo-electric cell and responsive to a rate of change in the output of said photo-electric cell substantially equal to that created by movement of a facsimile between a position of coincidence with said image in said beam and a position of non-coincidence therewith; and a peak-sensitive detector in circuit with said differentiating circuit and biased to pass only pulsations in the output of said photo-electric cell of substantially the magnitude created by the movement of a facsimile between said positions of coincidence and non-coincidence with said image in said beam.

52. In an apparatus of the class described the combination of a rotatable opaque disk having a plurality of annularly disposed, evenly spaced transparent facsimiles of a surface characteristic to be inspected, means for rotating said disk at a constant speed, an optical system arranged to direct a beam of light to be intercepted by said facsimiles successively as said disk is rotated at a constant frequency and focused to throw an image of the characteristic to be inspected in the locus of said facsimiles in said beam, a photo-electric cell in position to be energized by said beam of light passing through said optical system and said facsimiles, a filter in circuit with said photo-electric cell and adapted to block from the output thereof pulsations of the fundamental frequency equal to said constant frequency and having the property of passing frequencies created by the coincidence of said image with a substantially complete facsimile within said beam; a differentiating circuit connected to said filter and responsive to an output thereof caused by a rate of change in the output of said photo-electric cell substantially equal to that created by movement of a facsimile between a position of coincidence with said image in said beam and a position of non-coincidence therewith.

References Cited in the file of this patent

UNITED STATES PATENTS

| | | |
|---|---|---|
| 1,838,389 | Goldberg | Dec. 29, 1931 |
| 2,162,529 | Dawson | June 13, 1939 |
| 2,203,706 | Stockbarger | June 11, 1940 |
| 2,401,396 | Wolfner | June 4, 1946 |
| 2,438,588 | Tolson | Mar. 30, 1948 |
| 2,580,270 | Badgley et al. | Dec. 25, 1951 |
| 2,594,358 | Shaw | Apr. 29, 1952 |